United States Patent
O'Brien et al.

(10) Patent No.: US 11,935,014 B2
(45) Date of Patent: *Mar. 19, 2024

(54) PLASTIC ARTICLES MADE FROM THE SEGREGATION, DECONTAMINATION, AND PURIFICATION OF BIOMEDICAL WASTE PLASTICS IN A SYSTEM LEVERAGING WASTE PRODUCTION DATA TO MODIFY MATERIAL PURIFICATION AND PRODUCT MANUFACTURING

(71) Applicant: Polycarbin, Inc., Richmond, CA (US)

(72) Inventors: James Philip O'Brien, Richmond, CA (US); Noah James Pyles, Richmond, CA (US)

(73) Assignee: Polycarbin, Inc., Richmond, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,928

(22) Filed: Jan. 6, 2023

(65) Prior Publication Data
US 2023/0252428 A1 Aug. 10, 2023

Related U.S. Application Data

(63) Continuation of application No. 17/121,268, filed on Dec. 14, 2020, now Pat. No. 11,551,189.
(Continued)

(51) Int. Cl.
*G06Q 10/30* (2023.01)
*C08J 11/06* (2006.01)
(Continued)

(52) U.S. Cl.
CPC ............ *G06Q 10/30* (2013.01); *C08J 11/06* (2013.01); *G06K 7/1413* (2013.01);
(Continued)

(58) Field of Classification Search
CPC ....... G06Q 10/30; G08J 11/06; G06K 7/1413; H04L 9/32
(Continued)

(56) References Cited

U.S. PATENT DOCUMENTS

| | | |
|---|---|---|
| 11,551,189 B2 * | 1/2023 | O'Brien ................ H04L 9/3239 |
| 2019/0295045 A1 * | 9/2019 | Stöcker ................ G06Q 20/065 |
| 2021/0188541 A1 * | 6/2021 | Kurani ..................... B65F 1/14 |

OTHER PUBLICATIONS

PCT Search Report and Written Opinion for PCT App. No. PCT/US20/064891, dated Feb. 26, 2021, (in U.S. Appl. No. 17/121,268).

* cited by examiner

*Primary Examiner* — Ahshik Kim
(74) *Attorney, Agent, or Firm* — Remenick PLLC

(57) ABSTRACT

A process for the segregation, sterilization, and purification of recycled plastic medical waste with the subsequent production of plastic products made therefrom is disclosed. Also disclosed is a method for the front-end segregation of recycled plastic medical waste into a polypropylene waste stream and a mixed plastic waste stream. These segregated streams are further purified through a processing method that removes contaminating fibrous, metal and other waste products. Polypropylene and mixed plastic streams isolated using these methods yield a homogenous material that can be blended with other materials for the production of raw plastic or for extrusion to form commercial plastic products. A method for tracking regulated and non-regulated medical waste stream production kinetics and chain of custody from discrete waste disposal sites is also disclosed.

25 Claims, 15 Drawing Sheets

Related U.S. Application Data

(60) Provisional application No. 62/947,967, filed on Dec. 13, 2019.

(51) Int. Cl.
*G06K 7/14* (2006.01)
*G06K 19/06* (2006.01)
*G06Q 10/08* (2023.01)
*G06Q 30/018* (2023.01)
*G06Q 50/04* (2012.01)
*H04L 9/32* (2006.01)
*G06K 7/10* (2006.01)

(52) U.S. Cl.
CPC ..... *G06K 7/1417* (2013.01); *G06K 19/06028* (2013.01); *G06K 19/06037* (2013.01); *G06Q 10/08* (2013.01); *G06Q 30/018* (2013.01); *G06Q 50/04* (2013.01); *H04L 9/32* (2013.01); *C08J 2323/06* (2013.01); *G06K 2007/10504* (2013.01)

(58) Field of Classification Search
USPC .......................................... 705/308
See application file for complete search history.

PLASTIC ARTICLES MADE FROM THE SEGREGATION, DECONTAMINATION, AND PURIFICATION OF BIOMEDICAL WASTE PLASTICS IN A SYSTEM LEVERAGING WASTE PRODUCTION DATA TO MODIFY MATERIAL PURIFICATION AND PRODUCT MANUFACTURING

REFERENCE TO RELATED APPLICATIONS

This application is a Continuation of U.S. Non-Provisional Application Ser. No. 17/121,268, filed Dec. 14, 2020, and entitled "PLASTIC ARTICLES MADE FROM THE SEGREGATION, DECONTAMINATION, AND PURIFICATION OF BIOMEDICAL WASTE PLASTICS IN A SYSTEM LEVERAGING WASTE PRODUCTION DATA TO MODIFY MATERIAL PURIFICATION AND PRODUCT MANUFACTURING," which claims priority to Provisional Application U.S. Provisional Application Ser. No. 62/947,967, filed Dec. 13, 2019, and entitled "PLASTIC ARTICLES MADE FROM THE SEGREGATION, STERILIZATION, AND PURIFICATION OF REGULATED MEDICAL/BIOMEDICAL WASTE PLASTICS," both of which are specifically and entirely incorporated by reference.

FIELD OF THE INVENTION

The present invention is directed to a system by which a recyclable polypropylene waste stream and mixed plastic waste stream are first isolated from regulated medical/biomedical waste (RMW), decontaminated, and then further purified for the purpose of isolating individual polymer streams and recycling into plastic articles. These plastic articles preferably take the form of new laboratory plastic consumables, or other products. The invention also allows for the weight and production kinetics of the waste to be monitored using a waste tracking system rooted in the blockchain. The waste tracking system may utilize unique barcodes or Quick Response (QR) codes as identifiers for waste receptacles or utilize an internet of things (IoT) capable scale that uploads waste production data to a blockchain secure platform. High resolution waste production data may be utilized as a feed-backward or feed-forward mechanism to modify backend or frontend segregation, purification, safety profile and mechanical performance for recycled streams. Recycling count, for the closed-loop recycling method described herein, may be tracked utilizing a tracer and recorded within the blockchain-enabled waste tracking platform.

DESCRIPTION OF THE BACKGROUND

Medical waste, biopharma waste and laboratory waste are heterogeneous. In addition to paper and liquid waste, the contents include a variety of rigid and flexible plastics. Much of this plastic stream is capable of being recycled into useful products if properly decontaminated, thereby limiting environmental pollution by preventing waste accumulation in landfills and waste incineration. Due to the heterogeneous nature of this waste, it is difficult to obtain a homogenous plastic waste stream and effectively recycle the plastic. Most attempts to isolate these plastic polymers from heterogeneous medical waste, biopharma waste, and/or laboratory waste have relied heavily on backend segregation. Backend segregation is labor intensive, financially burdensome, and/or requires significant fortification of the resulting plastic to enhance its value as a resale commodity. There is a need to develop effective plastic diversion techniques capable of segregating this material and enriching the homogeneity of the waste stream to increase the quality of plastic for subsequent recycling. More specifically, there is a need for technology that allows for repeated isolation of high-quality resin to be used in circular economy products.

SUMMARY

One embodiment of the present invention is a series of front-end waste diversion receptacles that allow for the segregation of heterogeneous RMW, infectious waste, and/or non-hazardous waste into a polypropylene plastic stream and a mixed plastic stream.

A second embodiment of the present invention is a stage that may have wheels with an accompanying locking system, and an IoT-equipped scale capable of housing a plastic-diversion RMW receptacle or generalized RMW receptacle for tracking waste production through a blockchain secure platform.

A third embodiment of the present invention is a plastic waste receptacle that may be composed of recycled plastic and may replace cardboard biohazard boxes or other plastic containers while preferably having the capacity to stack for easy storage and may also be designed to withstand periodic heat and/or chemical-based sterilization procedures.

A fourth embodiment of the present invention is a plastic product made from recycled polypropylene, polystyrene, high density polyethylene, and/or polyethylene terephthalate medical waste streams of the present invention and fashioned for re-use, subsequent re-capture, and ultimately the propagation of the closed-loop recycling method.

A fifth embodiment of the present invention is a waste-tracking software that may quantify and summarize total plastic, polypropylene plastic, mixed plastic, non-plastic RMW, or non-RMW production coming from discrete waste disposal sites via a barcode, quick-response (QR) code, or other unique identifier utilizing a blockchain secure database.

A sixth embodiment of the present invention is a waste-tracking software that may function to monitor changes in total plastic production and contamination profile as a means to inform both front-end and back-end plastic sortation.

A seventh embodiment of the present invention is a waste-tracking software that may function to quantify, verify and monetize carbon emission reduction through documentation of total plastic recycled and re-used in product manufacturing.

An eighth embodiment of the present invention is a waste-tracking software that may function to provide certification of post-consumer recycled plastic point of origin, safety profile, and resin performance qualification.

A ninth embodiment of the present invention is a tracing element used in re-manufactured plastic articles made from the recycled plastic isolated in the present invention enabling the user to track recycling loop counts using the waste tracking platform.

A tenth embodiment of the present invention is a recycling system that sterilizes and employs a processing method that increases the homogeneity of the polypropylene plastic stream and mixed plastic stream to increase the quality of recyclable material for subsequent shredding, melting, extruding, pelleting and forming into plastic articles.

An eleventh embodiment of the present invention is a single unit device capable of decontaminating and shredding waste in a continuous process that is equipped with an IoT device that preferably records data associated with waste treatment parameters to inform subsequent material processing.

One embodiment of the invention is directed to a plastic waste recycling system. The system comprises a plastic waste tracking system comprising a database of plastic waste status data, a plurality of plastic waste receptacles, each plastic waste receptacle associated with an individual identifier, at least one identifier scanning device, each identifier scanning device adapted to scan each individual identifier and upload information regarding the associated plastic waste receptacle to the plastic waste tracking system, and a plastic waste processing system, the plastic waste processing system adapted to receive plastic waste from each plastic waste receptacle and update the plastic waste tracking system. The plastic waste processing system is adapted to process the plastic waste and output a recycled plastic product.

In a preferred embodiment, the plastic waste is regulated medical plastic or non-regulated scientific plastic waste and the plastic waste processing system at least one of sterilizes or decontaminates the plastic waste when necessary. Preferably, the plastic waste tracking system is a blockchain secure platform and the blockchain secure platform is updated to track the plastic waste through the plastic waste recycling system. In a preferred embodiment, the data updated in the plastic waste tracking system includes at least one of an origination location of the plastic waste, an origination weight of the plastic waste, a date of plastic waste collection, a time of plastic waste collection, a process undergone by the plastic waste, a location of plastic waste processing, a date of plastic waste processing, a time of plastic waste processing, or a composition of processed plastic waste.

Each plastic waste receptacle is preferably adapted to separate polypropylene waste from mixed plastic waste. Preferably, the polypropylene waste is processed differently from the mixed plastic waste. Preferably, the plastic waste processing system at least one of removes of colored, contaminated, or non-clear plastic, removes contaminants, shreds the plastic waste, blends the plastic waste with processing agents, granulates the plastic waste, or forms the plastic waste into a recycled product. The plastic waste recycling system preferably further comprises a user feedback system, the user feedback system adapted to provide information to users of each plastic waste receptacle, wherein the information is based on the data received by the plastic waste tracking system.

In a preferred embodiment, each plastic waste receptacle has a waste capacity sensor, wherein the waste capacity sensor is adapted to at least one of provide an alert to a user and update the plastic waste tracking system. Preferably, the outputted recycled plastic product is a blend of recycled plastic and at least one other plastic. In a preferred embodiment, the outputted recycled plastic product is comprised of one or more additives selected from compatibilizing agents, antioxidants, chemical tracing compounds, blending agents, colorants, and compounds enhancing product recyclability. Preferably, the data received by the plastic waste tracking system is used by the plastic waste processing system to adjust the processing of the plastic waste.

Another embodiment of the invention is directed to a method of recycling plastic waste. The method comprises the steps of creating a database of plastic waste status, receiving plastic waste at plurality of plastic waste receptacles, associating each plastic waste receptacle with an individual identifier, scanning each individual identifier and uploading information regarding the associated plastic waste receptacle to the database, receiving plastic waste from each plastic waste receptacle at a plastic waste processing location, processing the plastic waste, updating the plastic waste tracking system with data from the plastic waste processing location, and outputting a recycled plastic product.

Preferably, the plastic waste is medical plastic waste, further comprising the steps of at least one of sterilizing or decontaminating the plastic waste. The database is preferably a blockchain secure platform and the blockchain secure platform is updated to track the plastic waste through the plastic waste recycling system. In a preferred embodiment, the data updated in the database includes at least one of an origination location of the plastic waste, an origination weight of the plastic waste, a date of plastic waste collection, a time of plastic waste collection, a process undergone by the plastic waste, a location of plastic waste processing, a date of plastic waste processing, a time of plastic waste processing, or a composition of processed plastic waste.

The method preferably further comprises separating polypropylene waste from mixed plastic waste at each plastic waste receptacle. The polypropylene waste is preferably processed differently from the mixed plastic waste. Preferably, the step of processing the plastic waste comprises at least one of removing of colored, contaminated, or non-clear plastic, removing contaminants, shredding the plastic waste, blending the plastic waste with processing agents, granulating the plastic waste, and/or forming the plastic waste into a recycled product.

Preferably, the method further comprises providing user feedback to users of each plastic waste receptacle, wherein the feedback is based on the data received by the plastic waste tracking system. The method preferably further comprises providing user feedforward information to manufacturers and/or users of each plastic products, wherein the feedforward information is based on the data received by the plastic waste tracking system including at least one of mechanical performance of the recycled resin, safety specifications for the recycled resin, and the number of times material has been recycled.

Preferably, the method further comprises providing user feedback information to users regarding carbon footprint reduction based on recycling efforts at a resolution of at least one of individual personnel, research laboratories, entire research institutions or manufacturing facilities. The method preferably further comprises providing user feedforward information to users regarding carbon footprint reduction based on sustainable procurement by each user at a resolution of at least one of individual personnel, research laboratories, entire research institutions or manufacturing facilities.

In a preferred embodiment, each plastic waste receptacle has a waste capacity sensor, further comprising at least one of providing a waste capacity alert to a user and updating the database. The outputted recycled plastic product is preferably a blend of recycled plastic and at least one other plastic. Preferably, the outputted recycled plastic product is comprised of one or more additives selected from compatibilizing agents, antioxidants, chemical tracing compounds, blending agents, colorants, and compounds enhancing product recyclability. Preferably, the data received by the database is used to adjust the processing of the plastic waste.

Other embodiments and advantages of the invention are set forth in part in the description, which follows, and in part, may be obvious from this description, or may be learned from the practice of the invention.

BRIEF DESCRIPTION OF THE DRAWINGS

The invention outlined in greater depth below is supported by the accompanying drawings and figures. The numerals associated with the drawings refer to structural elements and features of a given process or invention embodiment. These figures emphasize the principles and concepts of the invention. It is important to note that the drawings are not to scale. Additionally, these figures are not meant to limit the claimed subject matter.

DETAILED DESCRIPTION

Figure 1:
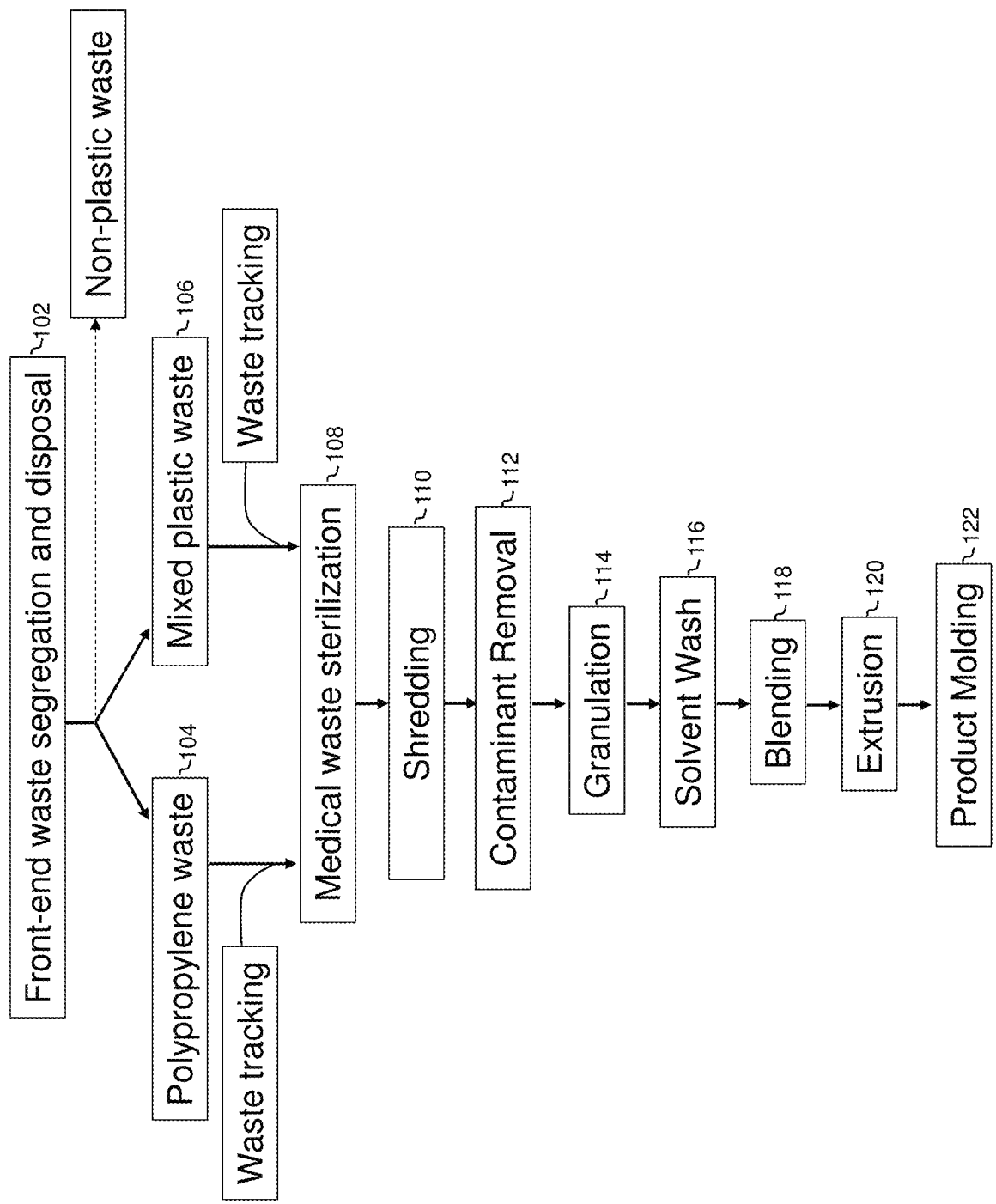
FIG. 1 shows an embodiment of a flowchart outlining the processing method to segregate, track, sterilize, and purify plastic waste streams for the purpose of recycling medical plastics to form plastic articles.

The description of commonly used terms or phrases and abbreviations are outlined below.

In this section, the reference to "one embodiment" or "an embodiment" means that a given element or feature associated with a particular embodiment is included in at least one embodiment. The reference to "one embodiment" does not necessarily include all embodiments of the disclosure. However, separate embodiments are also not mutually exclusive.

Use of the word "comprising" or "comprises" throughout this disclosure is not meant to indicate an exhaustive or exclusive description of an embodiment. Additionally, in some instances a device is "connected" or "coupled" with another item. This description may be meant to reflect a physical and/or logical relationship between items or devices. Also, there may be an intermediate(s) between said devices. For example, devices can be connected to one another through a physical or non-physical intermediate that allows for the transmission of information.

The word "or" when used in the context of a list is meant to encompass the following meanings: all items of the list, any single item in the list, or a combination of items in the list. Words such as "herein", "throughout," "above", "below," and similar words, refer to the document as a whole. These words are meant to refer to the entire document unless otherwise indicated.

In this disclosure, the use of the words "processor" or "processing device" refer to hardware within an electronic device that is capable of executing a programmed function. A processor or processing device may work alone or in conjunction with other processing devices to execute a programmed function.

Specifications presented herein include words like "may", "might," "can", or "could." These words are not meant to indicate that a particular feature or component is required for a particular embodiment.

In this disclosure, the use of the words "closed loop" refer to the process or system in which waste materials, or post-consumer materials, are isolated and used again in the manufacturing supply chains to make the same products for re-use.

The term "micronization" refers to the process by which an article is reduced in size to component parts. Micronization may be achieved with mechanical disruption.

The term "sterilization" refers to a decontamination process by which all microorganisms are killed.

The term "disinfection" refers to a decontamination process by which harmful microorganism are removed or reduced in number.

In the present disclosure, the use of the words "carbon emission offset" refers to the certification of a reduction in carbon dioxide emissions or other greenhouse gases. In the context of recycling, carbon emissions are reduced when utilizing recycled plastic resin instead of fossil-fuel derived virgin resin.

In this disclosure, "feed-forward" refers to the process by which collected data is used to inform subsequent business processes to effectively manage the material stream in real-time.

The term "feedback" refers to the process by which collected data, preferably recorded in the material tracking platform, is used to engage the user or customer to modify disposal behavior with the goal of improving material stream quality.

In this disclosure, "circular economy" or "closed loop" refers to the creation or propagation of supply chains that redirect valuable materials from waste streams for re-use in the manufacturing process. More specifically, laboratory plastic waste streams may be isolated, purified, and used to manufacture new laboratory consumables.

The term "regulated medical waste" may refer to a class of regulated waste leaving, but not limited to, research laboratories, clinical laboratories, biopharma laboratories, biopharma manufacturing sites and/or other medical work environments.

The term "database" and words of similar meaning are meant to refer to a device or devices in which data capable of being read by the computer and/or programming commands are stored. Furthermore, a "database" may refer to embodiments comprised of a single device or multiple devices that together store a set of data or programming instructions.

The waste diversion products, waste diversion containers, and/or waste receptacle stage, may include a processor and transceiver that enables these products to both send and receive data. This data can be exchanged between any of the aforementioned products and/or between one or more remote data storage facilities through an intermediary communication network. A remote processor may be associated with, but is not limited to, a server, a desktop computer, a laptop computer, or a mobile device. For the purpose of communicating between devices, a communication network may include a data network, a telephone network, a wireless network, or a combination of these networks.

In some embodiments, the waste tracking system disclosed herein further comprises a blockchain processing device that can track and register regulated medical waste moving through a chain of custody.

During the waste processing method outlined in this disclosure, contaminating waste may be removed to enhance the homogeneity of a waste stream. This may be accomplished using a variety of sensors to collect data that a processor can use to identify a piece of waste, determine if it is contaminating the waste stream, and have that item removed. A non-exhaustive list of sensors that may be used to identify non-plastic contaminants and other contaminating articles in the waste stream include: cameras, video cameras, inductive sensors, spectral imaging sensors, and near-infrared sensors.

The materials of the invention include a number of polymers and materials, both medical and non-medical waste, as well as nascent substances added to the proposed process. These materials include, but are not limited to, polypropylene (PP), polystyrene (PS), polyethylene (PE), polyethylene terephthalate glycol (PET-G), polyethylene terephthalate (PET), High Density Polyethylene (HDPE) Polyamide (PA), nylon, polyvinylchloride (PVC), ethylene vinyl acetate (EVA), and low density polyethylene (LDPE). Colorants, dyes, compatibilizers, and additives to enhance subsequent recycling may also be used in the processing method.

The invention described herein generates plastic articles made from recycled medical waste, or non-hazardous waste streams, through processing methods of front-end segregated PP and mixed plastic streams. Subsequently purified streams of independent polymers, including, but not limited to PP, PS, HDPE, PET-G are preferably used to create homogenous plastic materials in regrind form, pellet form, or as a finished product.

RMW used in the invention is generally in a contained bag or box and is comprised of, but not limited to, plastic, paper, trace amounts of liquid, and metal articles. These waste streams may have contacted biological laboratory specimens or patient materials and are therefore treated as contaminated waste that are preferably sterilized prior to disposal or recycling. RMW can include articles like plastic containers, syringes, plastic tubing, and other plastic disposable instruments. Additionally, medical waste can include materials used in research laboratories or in the production of biotechnology products like plastic conicals, pipette tips, cell culture materials, and chromatography columns. The waste not only contains a number of materials but also a diverse number of products making it difficult to create homogenous articles from medical waste without significant back-end segregation and fortification of the plastic with other waste streams. The methods of the present invention intend to provide a process implementing both front-end and back-end segregation of plastic for the purpose of creating purified polymer streams from a PP and mixed plastic stream segregated at the point of disposal.

Front-end plastic segregation of the present invention may initially occur within discrete waste disposal locations such as a research laboratory, operating room, biotechnology manufacturing facility, and/or other laboratory using waste diversion receptacles. Additionally, waste diversion receptacles may be used to capture plastic in these work environments that originate from a non-hazardous waste stream. This will preferably allow for the initial diversion of plastic medical waste from non-plastic medical waste and subsequent creation of a polypropylene and mixed plastic medical waste stream. Front-end segregation using waste diversion receptacles is intended to minimize the presence of fibrous, metal, and/or non-plastic contaminants within each recyclable plastic stream. Additionally, front-end segregation preferably limits exposure to other hazardous waste streams that may be disposed of in adjacent workflows. Downstream processing methods may enrich these independent plastic streams following decontamination by using a series of purification steps that increase the quality of the final recycled plastic. An automated and/or manual sorting system may remove plastic and non-plastic contaminants. A chemical treatment may remove markings or adherent substance found on the plastic. A step utilizing mechanical agitation or high-friction scrubbing may also be used to remove adherent contaminants on plastic products. A nuclease treatment step may assist in removing residual recombinant deoxyribonucleic acid (DNA) or ribonucleic acid (RNA). Density separation techniques may be used to separate polypropylene and polystyrene plastics. Residual, contaminating solvents may be removed using micronization technology that preferably increases plastic surface area exposure for cleaning during an aqueous washing step. Additionally, contaminating monomers, oligomers, and solvents, may be removed from the plastic stream utilizing devolatilization technology. Each step of the processing method preferably increases the homogeneity, purity, and quality of the recyclable plastic stream.

FIG. 1 shows a diagram of an embodiment of the segregation, tracking, purification and recycling method of the present invention. The plastic articles of the medical waste are preferably segregated from non-plastic articles using waste diversion products at discrete waste disposal sites at step 102. With the manual assistance of the individual disposing of the plastic medical waste, the plastic articles are preferably further segregated into a polypropylene container at step 104 and mixed plastic container at step 106. Users will preferably successfully segregate rigid plastic with the aid of visual cues proximal to the receptacle. This initial segregation step preferably minimizes the presence of fibrous, metal, and other non-plastic waste contaminants in the subsequent processing steps or final plastic products. This initial waste segregation step may be accomplished with a series of waste diversion products.

Figure 5:
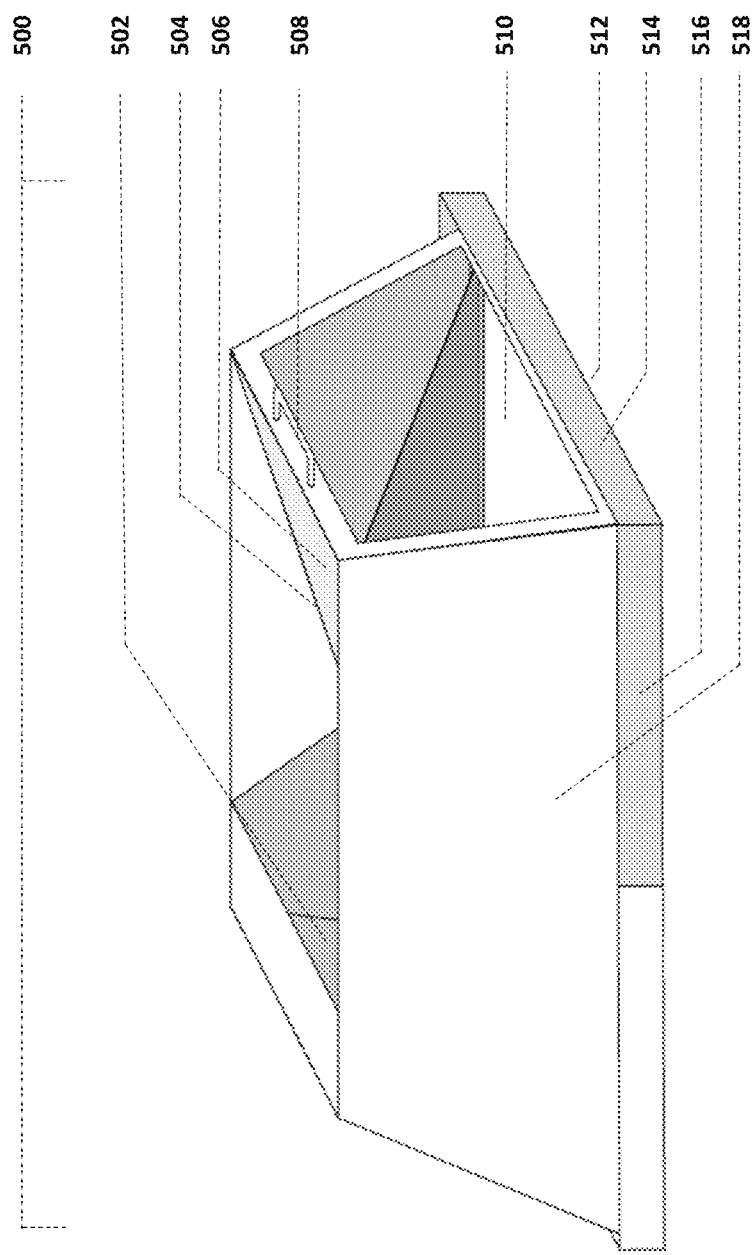
FIG. 5 shows an actuated medical waste diversion lid according to one embodiment.

FIG. 5 illustrates one embodiment of a waste diversion lid 500 that may be reusable, recyclable, and/or capable of undergoing a series of sterilization methods. In this embodiment, the diversion lid 500 may be coupled to an existing biohazard waste receptacle and/or RMW receptacle. Furthermore, in an embodiment of the invention, there is a polypropylene waste opening 502 that may be accessed by way of an angled ramp 504 and preferably directs waste articles into the receptacle. The ramp of the diversion lid 500 may feature written and/or visual directives or instructions 506 indicating the types of polypropylene products intended for disposal. The diversion lid 500 may also have a handle 508 that allows for the top part of the waste diversion lid 500 to be removed. The sides of the waste diversion lid 500 may be used for branding or advertising 514, 516, 518. In this embodiment, the front portion of the waste diversion lid 500 may contain a second opening 510 that may allow for the disposal of mixed plastics. Proximal to this opening there may be space 514 provided for images and/or text indicating that this is an entry for the collection of mixed plastic waste. In this embodiment, the bottom portion 512 of the diversion lid may be a separate piece. The waste diversion lid may also have a Quick Response (QR) code barcode, or other unique identifier on it to provide a unique product identifier for future waste tracking purposes, as described below. In other embodiments of a waste diversion lid, the opening for polypropylene products may be designed to reflect the shape and/or size of the items intended for disposal. Additionally, for waste disposal sites with homogenous plastic waste streams, the diversion lid can be constructed in a way to capture and divert those specific plastic materials. For example, in a genomics core facility that uses high volumes of polypropylene 96-well plates, a waste diversion lid may be constructed in such a way that effectively captures, and/or directs the user to dispose of, that specific waste product. For example, an opening may be constructed within an embodiment of a waste diversion lid that is designed specifically for the disposal of a desired waste product and more specific directives are used to increase disposal adherence.

Figure 6:
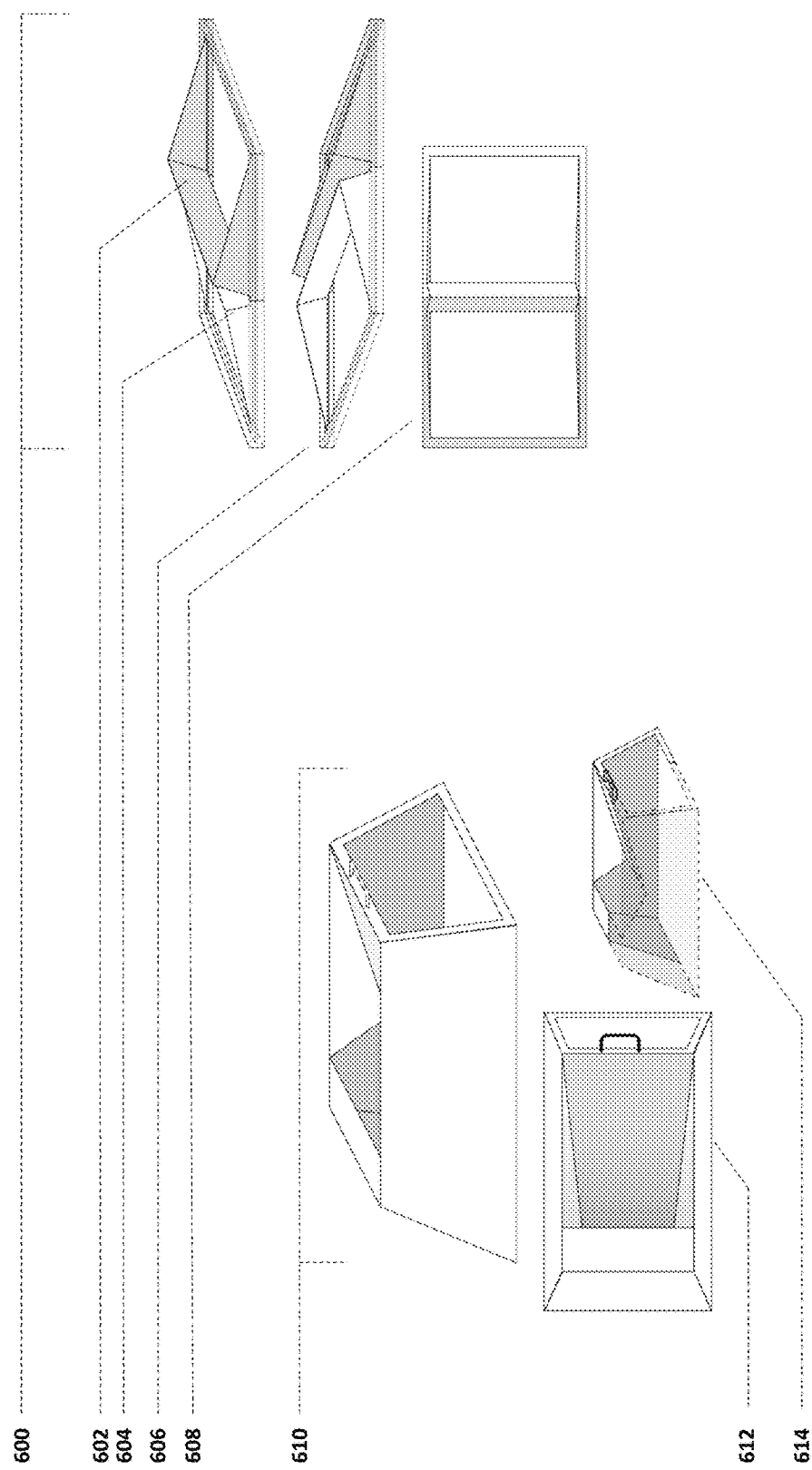
FIG. 6 shows the two structural pieces comprising the embodiment shown in FIG. 5.

FIG. 6 illustrates the two pieces that comprise one embodiment of the waste diversion lid 500. Waste diversion lid 500 may be constructed in two parts. As can be seen in the exploded view, the bottom half of the lid may function as a platform 600 that rests on the waste receptacle in order to hold the diverting component of the lid. The platform 600 portion of the lid may contain a vertical separator 602 that prevents cross contamination of waste streams and may allow one internal waste receptacle bag to be secured in place. In this embodiment, a second piece 604 preferably allows for a for a second internal waste receptacle bag to be secured in place. A second view 606 of the bottom portion of the lid described in the present embodiment provides an alternative view of piece 602 and piece 604 that preferably assist in securing two internal waste bags. The top portion 610 of waste diversion lid 500 preferably sits on top of the bottom unit 600. A top-down view 612 of the present embodiment of the diversion lid top portion 610 is illustrated in this figure. A cross section 614 of diversion lid top portion 610 illustrates the ramp that preferably directs waste to the back of the receptacle and into a separate internal waste receptacle bag. In present embodiment of the waste diversion lid 500, the front opening 510 allows for waste to be directed into an internal waste receptacle with vertical separator 602 preferably preventing waste from contaminating the other internal waste receptacle.

Figure 7:
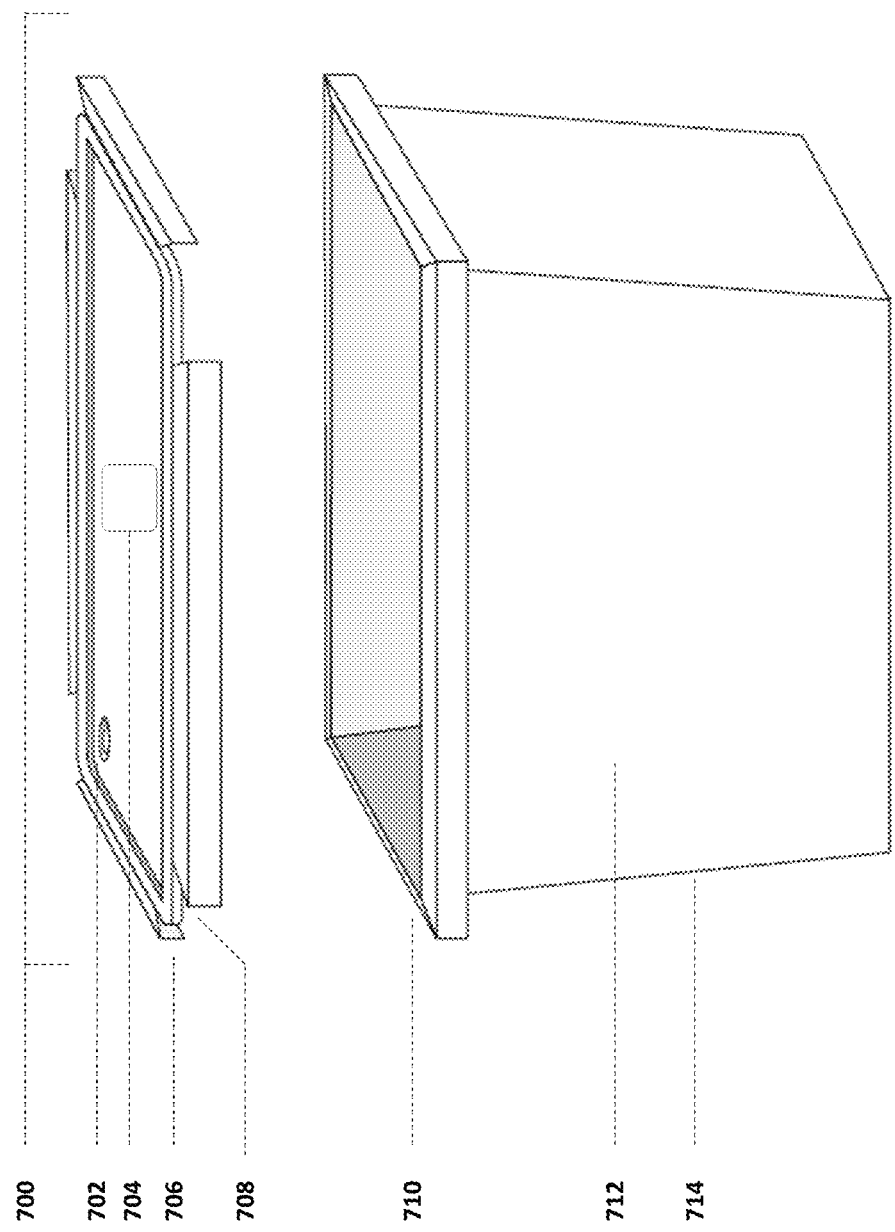
FIG. 7 shows an actuated receptacle for plastic elements of medical waste according to one embodiment.

As an alternative to existing medical waste receptacles, FIG. 7 illustrates a waste receptacle 710 that may be reusable, recyclable, and/or capable of undergoing a series of sterilization methods. The top of the receptacle 710 may be compatible with a waste diversion lid 500 and/or a cover 700 that is preferably fashioned with hinged latches 706 on each side that may fasten the cover 700 to receptacle 710. In this embodiment of the cover and receptacle, the hinged latches 706 preferably seal the sides 708 of the cover to the receptacle 710. The cover 700 may be fashioned with a vent 702 that preferably allows for steam release during waste receptacle 710 decontamination in the recycling methods disclosed here. Additionally, the cover 700 may include a unique QR code 704 identifier for use in the waste tracking software. The sides 712 of the receptacle 710 may be a surface for visual directives or other forms of communication. The tapering sides 714 of the receptacle 710 preferably allow for empty receptacles to be stacked and nested within one another. Waste receptacle 710 is preferably compatible with a waste diversion lid 500. Additionally, the waste receptacle 710 may be connectable to a generalized waste container.

Figure 9:
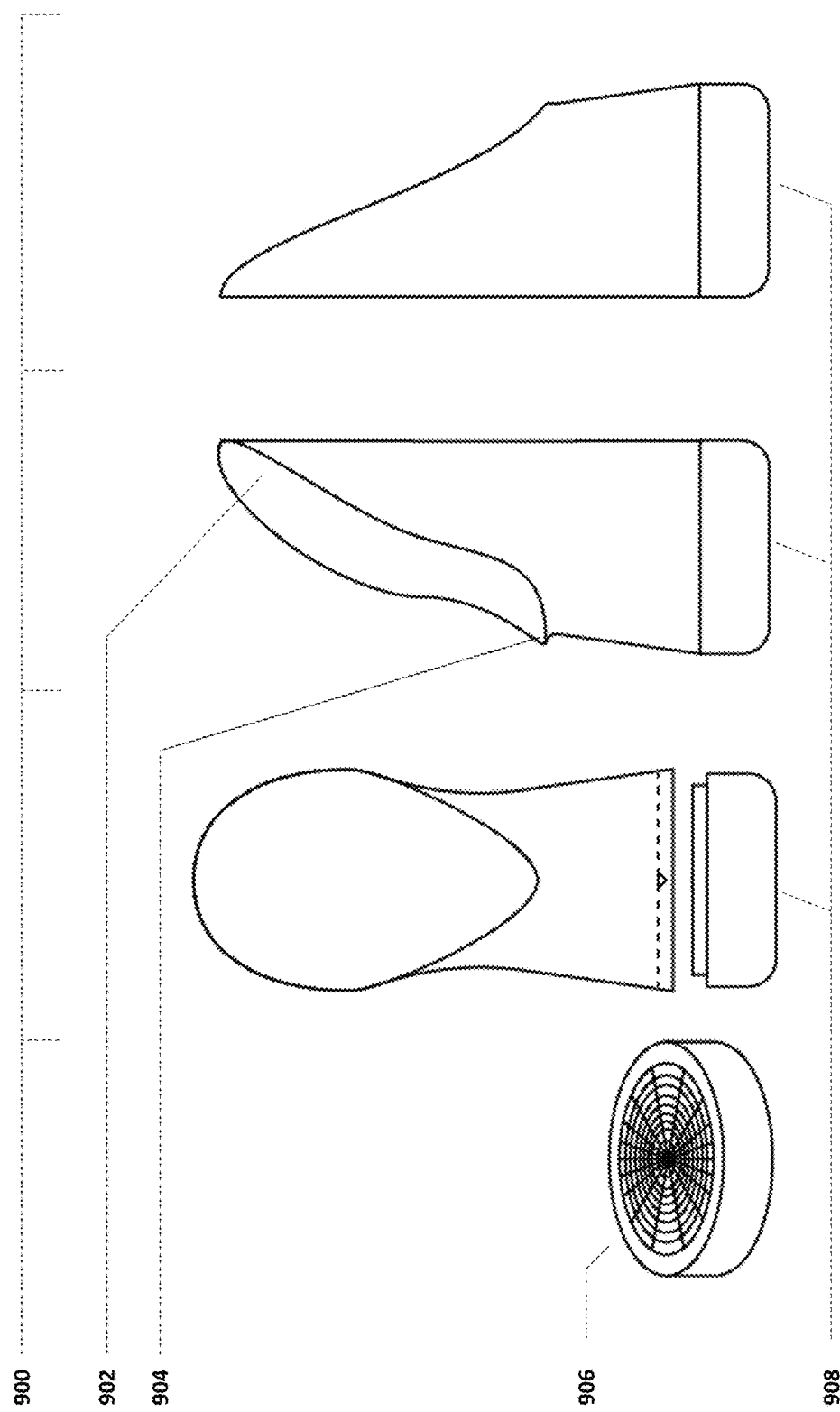
FIG. 9 shows an actuated plastic medical waste receptacle for waste disposal at a laboratory bench or workspace.

In order to ensure collection of plastic waste created at satellite locations that are not proximal to a larger waste diversion lid 500 that may be fashioned to a waste receptacle 710, there may be a need for smaller waste receptacles. FIG. 9 illustrates a plastic waste receptacle that may be placed on a laboratory bench or proximal to other convenient waste disposal locations. This embodiment of a plastic waste receptacle 900 may have a backstop 902 to help capture and direct plastic products into the multi-liter storage container 904 may be reusable, recyclable, and/or capable of undergoing a series of sterilization methods. In one embodiment waste receptacle 900, the plastic storage container may be attached to a secondary container. The top of this secondary container may be fashioned with a grated lid 906 that may enable the user to sterilize the plastic contents of the receptacle with a liquid sterilizing agent and/or filter remaining liquid. In this embodiment, the liquid sterilizing agent or other draining fluid may be captured in the secondary container 908 and allow for convenient disposal. Upon reaching capacity of receptacle 900, the plastic contents may be transferred to a larger waste diversion lid 500 that may be fashioned to a waste receptacle 710.

Figure 2:
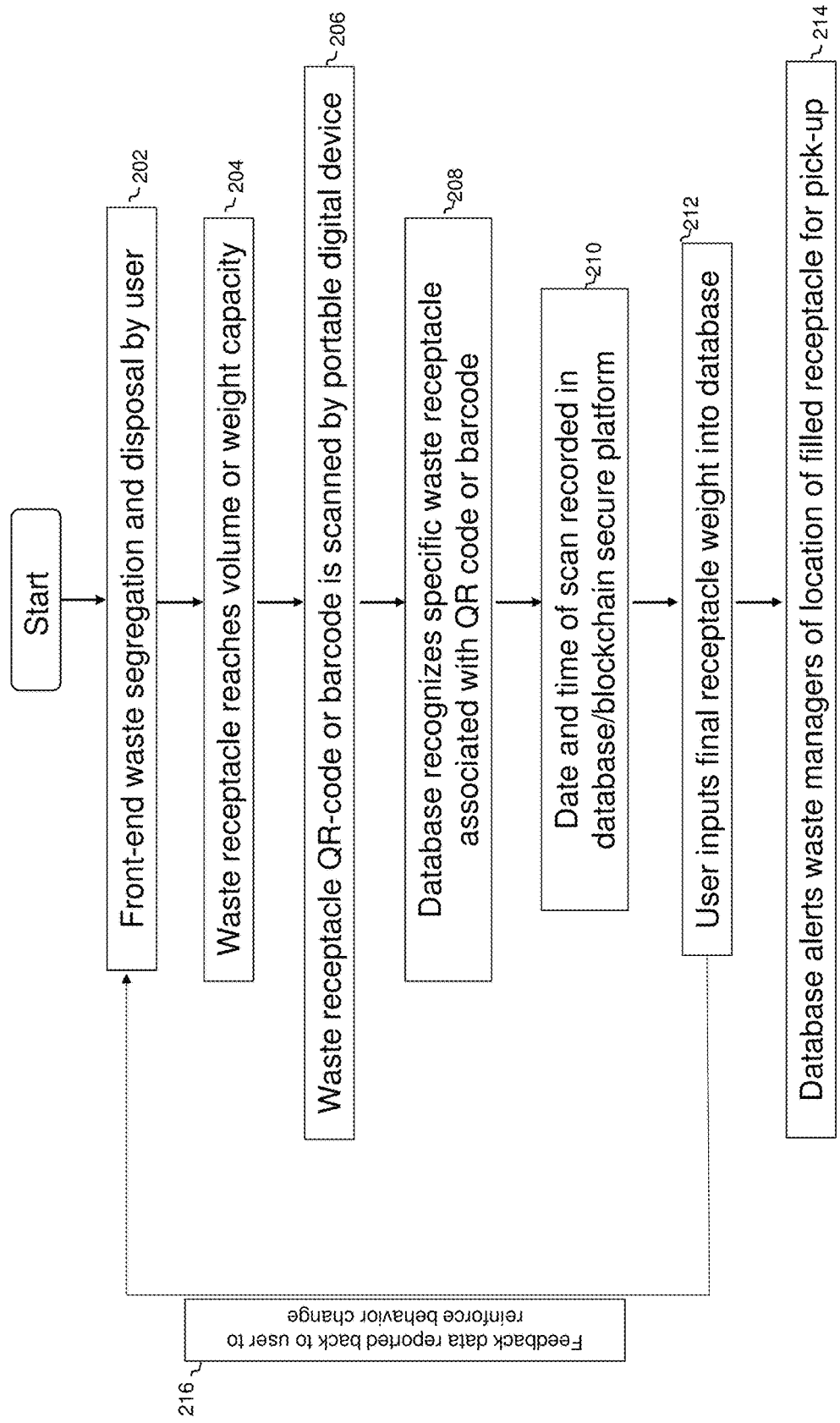
FIG. 2 shows an embodiment of a flowchart of a method used to track the production of plastic and non-plastic medical waste at discrete waste disposal locations, using production data to modify frontend and backend disposal/sortation in real-time.

Using Quick Response (QR) codes, barcodes, or other unique product identifiers, medical waste, other forms of hazardous waste and/or non-hazardous waste production kinetics may be tracked in this recycling method. FIG. 2 is an embodiment of a flowchart outlining the process through which waste tracking is enabled in the present recycling method and recorded data is preferably used to modify plastic sortation. Each plastic diversion product may be registered with a unique QR code, for example. Following repeated front-end segregation and disposal of plastic waste in step 202, the waste receptacle may reach volume or weight capacity in step 204. The entity responsible for disposing of the waste will preferably scan the unique QR code, or other product identifier, associated with a receptacle using an iOS or Android mobile application interface or another digital portable device at step 206. A database at step 208 preferably will recognize that the unique code identifier previously scanned or identified is associated with a specific waste receptacle at a specific location. Information like date and time may auto-populate within the database upon scanning or entry of a record, thereby timestamping the waste receptacle's closure/turnover at step 210. The user will preferably then be directed to a database interface that allows the user to record the final weight and/or notify the database that the receptacle is full at step 212. The database, having been notified that the waste receptacle is full, may subsequently notify waste managers that the receptacle is prepared for removal using a communication network at stage 214. Preferably, this real-time communication adds efficiency, safety, and compliance to the operational process of regulated medical waste management. Data within the database may be stored within a blockchain secure platform. This data collection will preferably allow total waste production and waste production kinetics to be utilized as feedback data that may be reported back to individual users and/or institutions to reinforce disposal behavior at step 216.

Preferably following waste decontamination, a record can be submitted to the blockchain platform of the aggregated waste, previously identified by independent waste disposal site identifiers. This waste is usually then shredded and subjected to sortation and purification methods. A new composite barcode or QR code will preferably be assigned to the aggregate plastic streams. This new record added to the blockchain will preferably document point of origin for a batch of plastic that is preferably recycled and may also be compounded with virgin resin, compatibilizing agents or other materials. The composite barcode/QR code/unique identifier can be deconvoluted to identify the individual waste disposal sites that contributed to that batch of material. Subsequent batches of recycled plastic resin will preferably be generated from the aggregation and sortation of plastic streams. Point of origin, and/or composite point of origin, for each batch of recycled plastic resin will preferably be recorded in the blockchain. Additionally, each batch of recycled resin will be subjected to quality control analysis. Quality control tests may include, but are not limited, to proposition 65 testing, gas chromatography mass spectrometry and other tests to identify comminating compounds. Plastic resin characterization tests for each batch of recycled plastic resin may be conducted to identify final plastic resin melt flow rate, tensile strength at yield, tensile elongation at break, flexural modulus, notched Izod, and filler content. Tracking material chain of custody from the point of material disposal through isolation of recycled plastic resin will preferably allow material origin to be identified for each batch of recycled resin. Information like quality control test results, resin characterization, and point of origin may be recorded in the blockchain database and linked with a unique identifier representing a batch of recycled resin for reference by downstream users who may modify material handling parameters based on these results. High resolution waste production data may be utilized as a feed-backward or feed-forward mechanism to modify frontend or backend segregation, purification, safety profile, and mechanical performance for recycled streams.

This blockchain enabled waste tracking system may be capable of monitoring non-recyclable medical waste, and/or other hazardous waste, from the time a waste receptacle is filled until the waste reaches its terminal waste disposal location. Following waste decontamination, a record can be submitted to the blockchain platform of the aggregated waste, previously identified by independent waste disposal site identifiers. This waste is preferably then shredded. A new composite barcode or QR code will preferably be assigned to the aggregate waste that is subsequently transported for disposal in a landfill. This new record added to the blockchain will preferably document waste weight and final destination (e.g. landfill) of the sterilized and shredded aggregate waste. The composite barcode/QR code/unique identifier can be deconvoluted to identify the individual waste disposal sites that contributed to that landfill bound waste.

In one embodiment of the medical waste tracking system, a waste receptacle cover 700 may have a one-dimensional barcode or quick response (QR) code 704 associated with it. A portable digital device may be able to scan that code. Alternatively, the device may be connected by a wireless network with a mobile computer device that has optical code reception capabilities in order to read a barcode or QR code, detect and identify the waste diversion product associated with a distinct waste disposal location.

The utilized portable digital device can then communicate with a processing server utilizing an internet connection. This will allow for the portable digital device to obtain information about the product, including, but not limited to, the location and entity responsible for that product. More specifically, this data may be information read by the operator of the portable device that allows them to confirm that the product information accurately depicts the scanned unit.

An external process of recording this waste tracking data can be employed. This method of data recording preferably employs blockchain technology and is immutable.

Blockchain technology may rely on a system of nodes that function as physically and logically separated servers and data memory storage sites. These nodes are maintained by separate entities. With the addition of blockchain nodes, there are more nodes that are responsible for collecting and exchanging the same information. This information is commonly shared between nodes by way of block creation. All nodes have access to this distributed ledger. However, if an adjustment to a record is established on one node, it will be different from all the other records on the independently maintained blockchain servers and therefore easily identifiable.

Within this system, a record becomes a block of data. Data processed by the system is also linked with previously recorded and input data by way of a block. Therefore, one block is inextricably linked to a previous block. Moreover, each block contains a one-way hash of the preceding block. This one-way hash functions as a hash pointer that contains the address and hash of the data from the preceding block. A record is also created within each block that makes use of a timestamp, allowing it to be compared to other blocks. Thus, a block, containing a record of input data, cannot be changed without also altering other blocks within the chain.

The blockchain technology employed for the purpose of tracking medical waste may require secure encryption of the accumulated data. This would add additional security as data is transferred between a processing server and a node within the blockchain distributed network. The system may use a secret key that may exclusively be known by a processing server and the node which is recording data for the subsequent block. For the purpose of using this system to track medical waste, the record, associated with a unique product identifier representing a specific waste disposal site at a given institution, may be received by a node with secret key.

Each block is preferably capable of being viewed in this permission-based system. However, encryption of the data during data transit preferably prevents viewing. Additionally, during server query of a node to determine the content of a block, a block associated with a unique waste identifier, the communication of the record is preferably encrypted and decrypted using the known key and respective decryption algorithm.

A public key can be given to authorized individuals. This form of asymmetric cryptography would allow an individual(s) the ability to check a block at any node where the private key is used to encrypt the block made by the processing server. This form of cryptography would preferably allow for a distributed ledger to maintain confidentiality through the encryption of data using the public key. Furthermore, preferably only those devices (computers, mobile phones etc.) that have the private key could decrypt a record within a block. While blockchain encryption and tracking is described herein, other types of encryption and/or tracking can be utilized.

Figure 10:
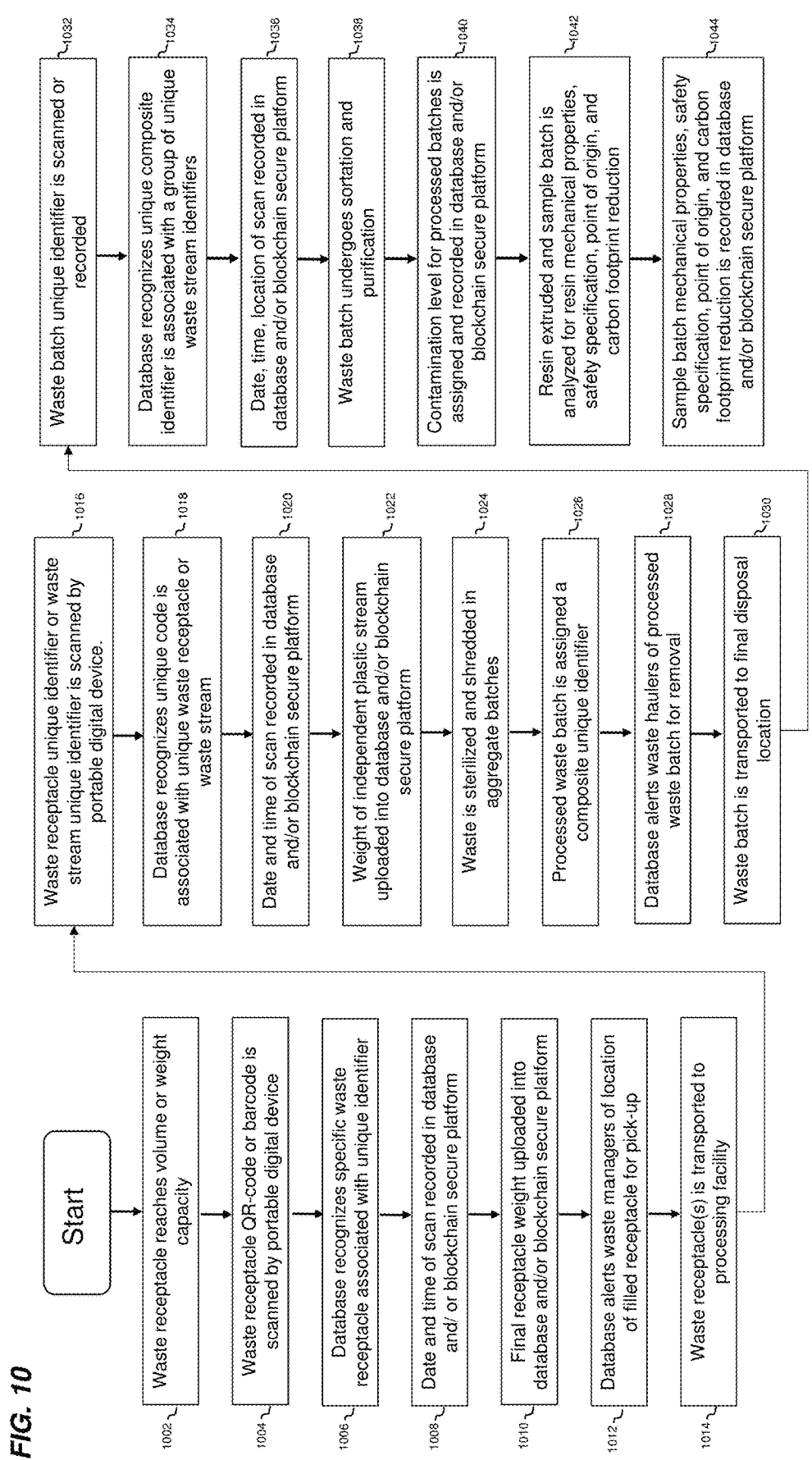
FIG. 10 shows an embodiment of a flowchart outlining the process of using waste tracking software for each step in the chain of custody of medical waste, preferably using this production data to modify plastic sortation, provide post-consumer plastic point of origin, store batch quality control data, and quantify carbon emission offset data.

FIG. 10 is an embodiment of a flowchart outlining the process through which a waste tracking system may be used to follow the chain of custody of the waste and increase the efficiency of management. At each stage within the chain of custody of medical waste, a record will preferably be established within a blockchain platform using unique product identifiers, like a QR code, specific for the waste receptacle or waste stream. At step 1002, a waste receptacle may reach volume capacity or weight capacity, e.g. 30 lbs, or the waste may be removed at designated waste pickup times. This event may alert a waste manager to prepare the waste receptacle for removal and, as a result, the waste manager may use a portable digital device to scan the receptacle unique identifier or create a record in the blockchain database at step 1004. This unique identifier may be a QR code, barcode, RFID chip, or another product identifier. In step 1006, a database communicating with the portable device may recognize the specific waste receptacle associated with the unique identifier. The date and time of the scanning action or record creation will preferably be recorded in the database and/or blockchain database at step 1008. At step 1010, the digital portable device may prompt the waste manager to input the weight of the waste. This information may also be recorded within the blockchain. Subsequently, the database and accompanying processing server may inform waste managers of the filled receptacle location for removal at step 1012. Preferably, this real-time communication adds efficiency, safety, and compliance to the operational process of regulated medical waste management. The filled receptacle, in step 1014, may subsequently be transported to a waste processing facility. This processing facility may be a centralized location for sterilization and shredding of waste. Preferably upon arrival of the waste at the processing facility, the waste receptacle unique identifier may be scanned or a record will be created for submission to the blockchain at step 1016. At step 1018, preferably the database will recognize the unique identifier associated with a specific waste receptacle or specific waste stream. The date, time, and weight may be uploaded to the blockchain secure platform during step 1020 and step 1022. Subsequently, the waste may be sterilized and shredded in an aggregate batch of numerous waste streams in step 1024. The processed waste batch, which may be comprised of several known waste streams with unique, documented identifiers, may be assigned a unique batch identifier using a QR code, barcode, RFID chip, or other unique identifier in step 1026. The database and accompanying processing server may communicate with waste haulers that a processed waste batch has or will be prepared for removal during step 1028. The processed waste batch may be transported to a final disposal site in step 1030. The disposal site may be a landfill, recycling processing center or other waste disposal location. By tracking and facilitating material stream recycling, this technology preferably quantifies and/or verifies carbon emission offsets associated with the recycling method. More specifically, the resulting recycled resin preferably replaces the use of virgin resin in newly manufactured plastic articles and is, therefore, associated with a reduction in carbon emissions. At step 1032 the unique identifier assigned to the processed waste batch may be scanned or recorded. A database may recognize the unique identifier associated with the processed waste batch as well as the unique waste stream identifiers that contributed to the waste batch in step 1034. In step 1036, the data, time, and location of the record entry preferably will be uploaded to the blockchain. Decontaminated waste streams may undergo additional sortation and purification to isolate a recycled resin in step 1038. Through a material monitoring method, a contamination score may be assigned to batches of processed material streams and recorded in the blockchain secure platform in step 1040. Preferably, batches of recycled plastic resin that are isolated from the system outlined in the present disclosure will be subjected to quality control analysis in step 1042. Quality control tests include, but are not limited to, gas chromatography mass spectrometry and other tests to identify comminating compounds. Additionally, plastic resin characterization tests for each batch of recycled plastic resin may be conducted to identify plastic characteristics including, but not limited to, melt flow rate, tensile strength at yield, tensile elongation at break, flexural modulus, notched Izod, and filler content. Preferably, the recycling and tracking method will allow material origin to be identified for each batch of recycled resin, by tracking material chain of custody, to verify that it is post-consumer material. Information like quality control test results, resin characterization, point of origin, and carbon footprint reduction may be recorded in the blockchain database in step 1044 for reference by downstream users who modify manufacturing parameters based on these results.

In FIG. 10 the database described preferably is associated with a processing server. That database preferably contains records of regulated waste production and regulated waste production kinetics associated with unique waste disposal site identifiers. For work environments like a laboratory, where scientists, technicians, and/or other users work in association with a specific waste receptacle, the waste tracking platform preferably will be used to provide the user with personalized, high resolution waste production data associated with their material usage. By tracking material chain of custody, waste stream purity, and quantification of total plastic recycled over time, a user's personalized waste stream data may be used as feedback to modify behavior during front-end segregation of material by the user.

Figure 11:
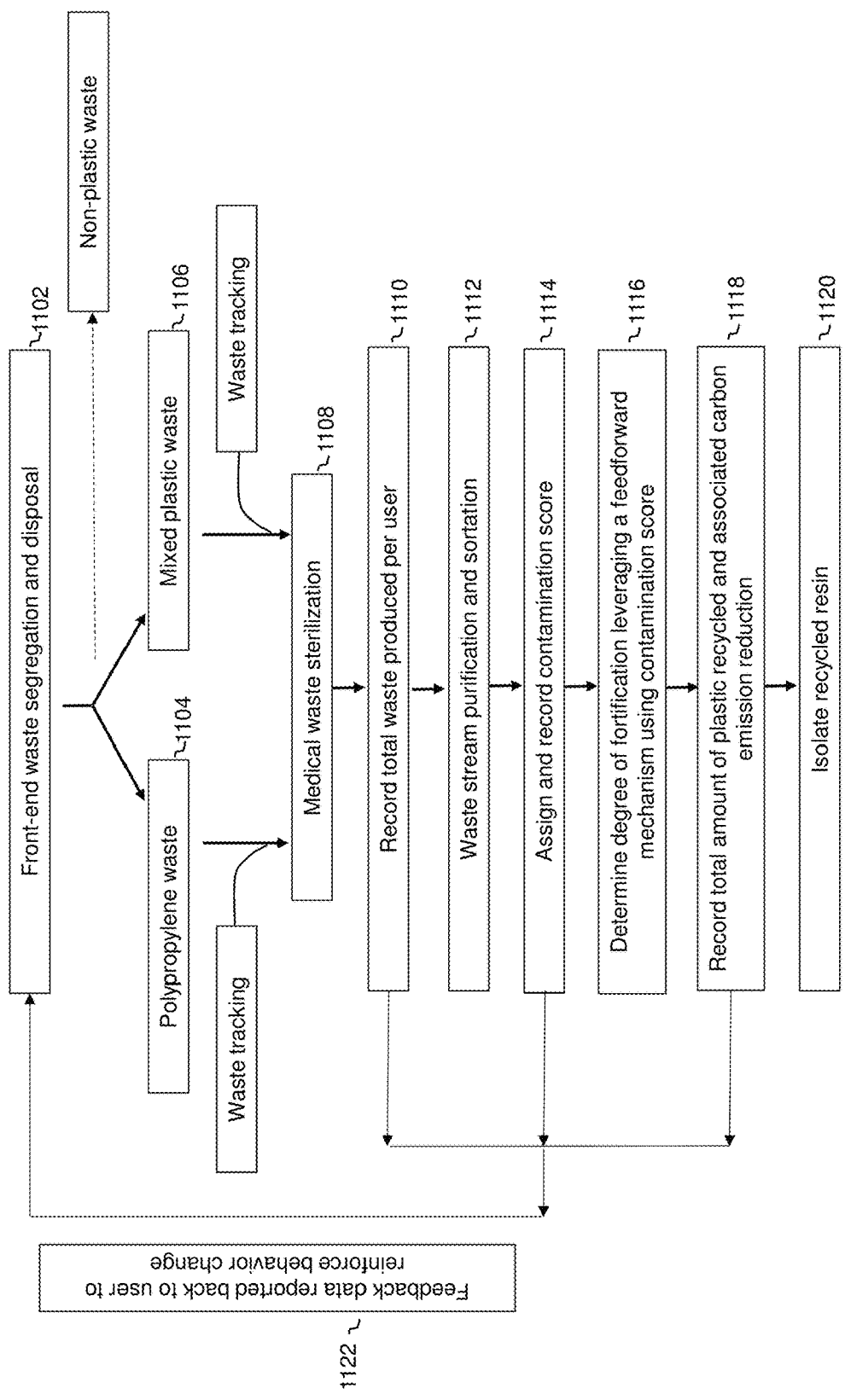
FIG. 11 shows an embodiment of a flowchart outlining the waste tracking software comprising the recycling method utilizing feedback data reported back to user to reinforce point of disposal behavior change.

FIG. 11 shows an embodiment of a flowchart outlining how high-resolution waste production data can be leveraged to provide feedback data for the purpose of reinforcing waste disposal behavior change for the recycling method described in present disclosure. The plastic articles of the medical waste are preferably segregated from non-plastic articles using waste diversion products at discrete waste disposal sites at step 1102. With the manual assistance of the individual disposing of the plastic medical waste, the plastic articles are preferably further segregated into a polypropylene container at step 1104 and mixed plastic container at step 1106. Preferably, in a subsequent step, the front-end segregated waste will be decontaminated in step 1108. In a manner similar to the process outlined in FIG. 10, a record will preferably be created in the database for the total waste produced per user in step 1110. The waste may undergo further sortation and purification in step 1112 and using data collected through a monitoring system, a contamination score may be assigned to batches of processed material streams and recorded in the blockchain secure platform in step 1114. This contamination score may subsequently be used to determine the necessary fortification with additives, including but not limited to compatibilizing agents, virgin resins, or other plastic polymers in step 1116. In a manner similar to the process outlined in FIG. 10, following this fortification step, a record of total amount of plastic recycled and associated carbon emission reduction for the employed recycling method may be recorded in the database in step 1118. A batch of recycled resin is preferably isolated in this embodiment of the present invention 1120. Data recorded in the waste tracking database at steps 1110, 1114, and 1118 may provide feedback data to the user to reinforce waste disposal behavior change in step 1122.

For example, a reduction in the total plastic recycled by the user over time, may trigger digital engagement of the user to report this identified trend. Preferably, this personal waste data will be reported to the user through the mobile device used to trigger waste removal. Additionally, personalized waste data may be reported by other means including but not limited to e-mail or cellular text messages. Reporting of personalized waste data may also include additional training materials to remind the user on proper disposal behavior. Personalized data reporting preferably is used to modify user behavior for front-end segregation of desired waste streams. More specifically, a record of total plastic recycled per user of an institution may be associated with a carbon emission offset and/or carbon credit, which may be monetized by the recycling company or the user. Reports of carbon emission offset data for an individual user or institution may be used as a feedback mechanism to modify disposal behaviors.

Within FIG. 10, the operators mobile scanning device or other enabled device used to make record entries preferably connects to the internet. A wired system for internet access may also be used. Additionally, the scanning device preferably is capable of identifying product specific identification codes. The scanning device or device used to make record entries preferably communicates via the internet with the processing server and database. Multiple blockchain nodes and/or a centralized blockchain database, will preferably help to establish the ledger of recorded waste tracking data. The processing server in the blockchain-enabled waste tracking system can preferably communicate with blockchain nodes by way of the internet. When a record is processed and a block is added to the blockchain, an inquiry to a blockchain node will preferably allow for inspection of each block. Finally, the medical waste measurements referenced in FIG. 10 may also be accomplished using the waste receptacle stage with IoT scale 800 of FIG. 8. Throughout the process outlined in FIG. 10, unique identifiers, like a barcode or QR code, may be created in real-time to specifically refer to a waste stream with specific information like disposal time, disposal date, originating disposal location, and final weight, among other information.

Blockchain encryption can be utilized in the following example of waste disposal: when medical waste produced by an entity moves through a chain of custody, a record is generated. Characteristics like date, time, weight, and waste disposal site of origination may be associated with a unique waste receptacle identifier. The record is subsequently encrypted with a public key and the necessary encryption algorithm. Encrypted data is then communicated to the processing server and decrypted with a private key. Security of this data transfer is enhanced by hashing the record. If the same hash is present before and after decryption, the data transmitted has not changed.

Figure 13:
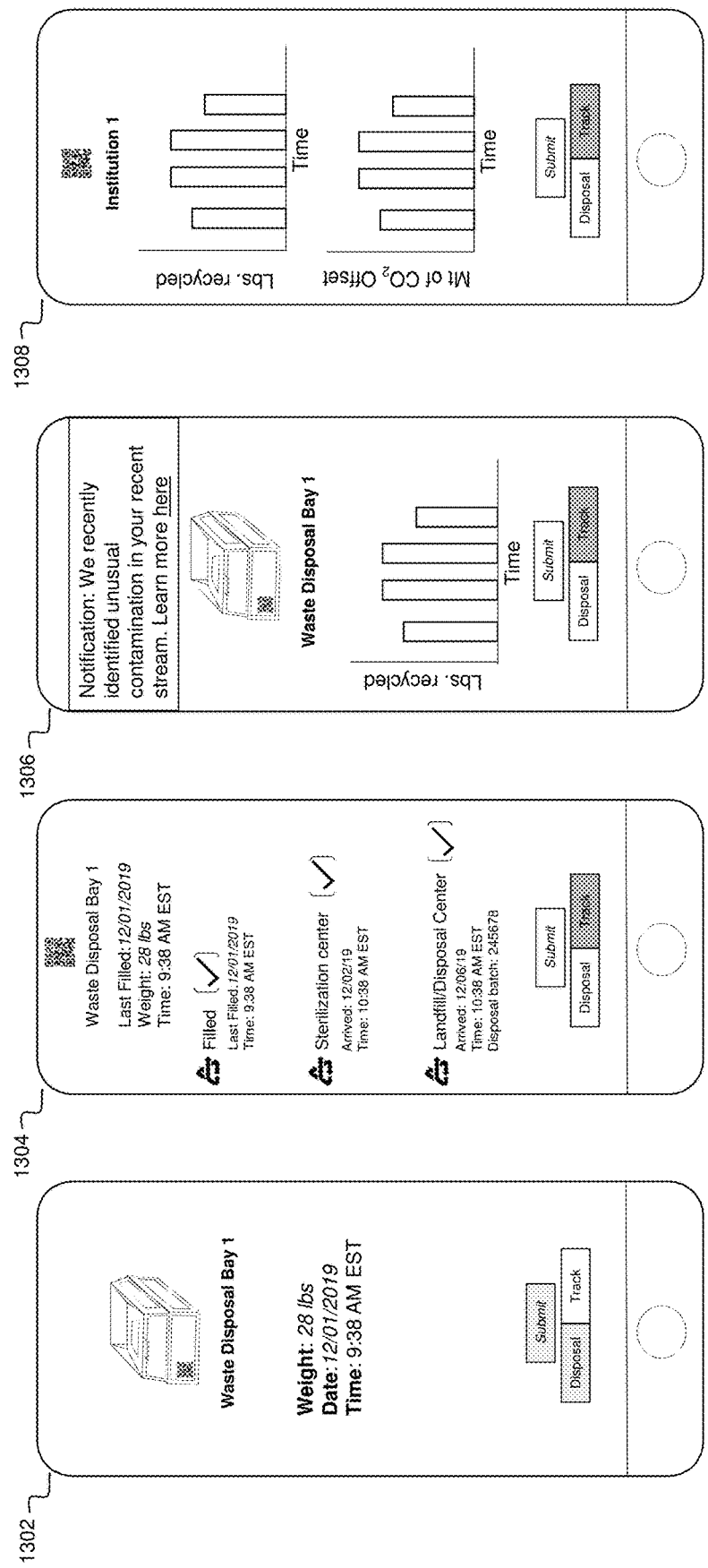
FIG. 13 shows an actuated illustrative interface for the waste tracking and reporting mobile application.

Users of an embodiment of the waste tracking system can use a mobile device, desktop computer or another portable or non-portable computing device. Devices enabled for this system will preferably be capable of identifying unique code identifiers for record submission 1302 to a database and for providing a waste tracking and waste production summary 1304. For example, in FIG. 13 the date, time, weight, and unique waste identifiers can be independently documented and viewed. This can be accomplished using an approved device that is capable of making an inquiry to access the relevant block(s) of the record in question, currently present in a ledger within the blockchain. A mobile device or desktop computer may provide waste production data and behavior modification prompts 1306 as feedback to the individual user in an effort to promote proper disposal during front-end segregation of the plastic waste. A mobile device or desktop computer may provide waste production data and behavior modification prompts 1308 for a number of individual users across an organization and preferably use this feedback data to promote proper disposal during front-end segregation of the plastic waste going forward.

The system may use unique product identifiers like barcodes, QR codes, RFID tags to label waste streams at each stage within the chain of custody. Initially, at discrete waste disposal sites, the system may use QR codes assigned to waste diversion products or receptacles that can be scanned upon filling the waste receptacle. This may register the waste box as ready for transport to a centralized processing facility. Next, a unique product identifier affixed to internal waste stream receptacles can be scanned in the central processing facility immediately prior to sterilization and shredding. Finally, a unique product identifier may be assigned to the aggregated shredded medical waste. This unique identifier for bulk shipments can be deconvoluted to identify the waste disposal sites contributing to the bulk shipment. Upon final disposal of the bulk waste shipment, a final record may be created notifying the location of waste disposal and a block will be added to the blockchain, thus establishing a continuous, immutable record of the medical waste disposal process.

Figure 3:
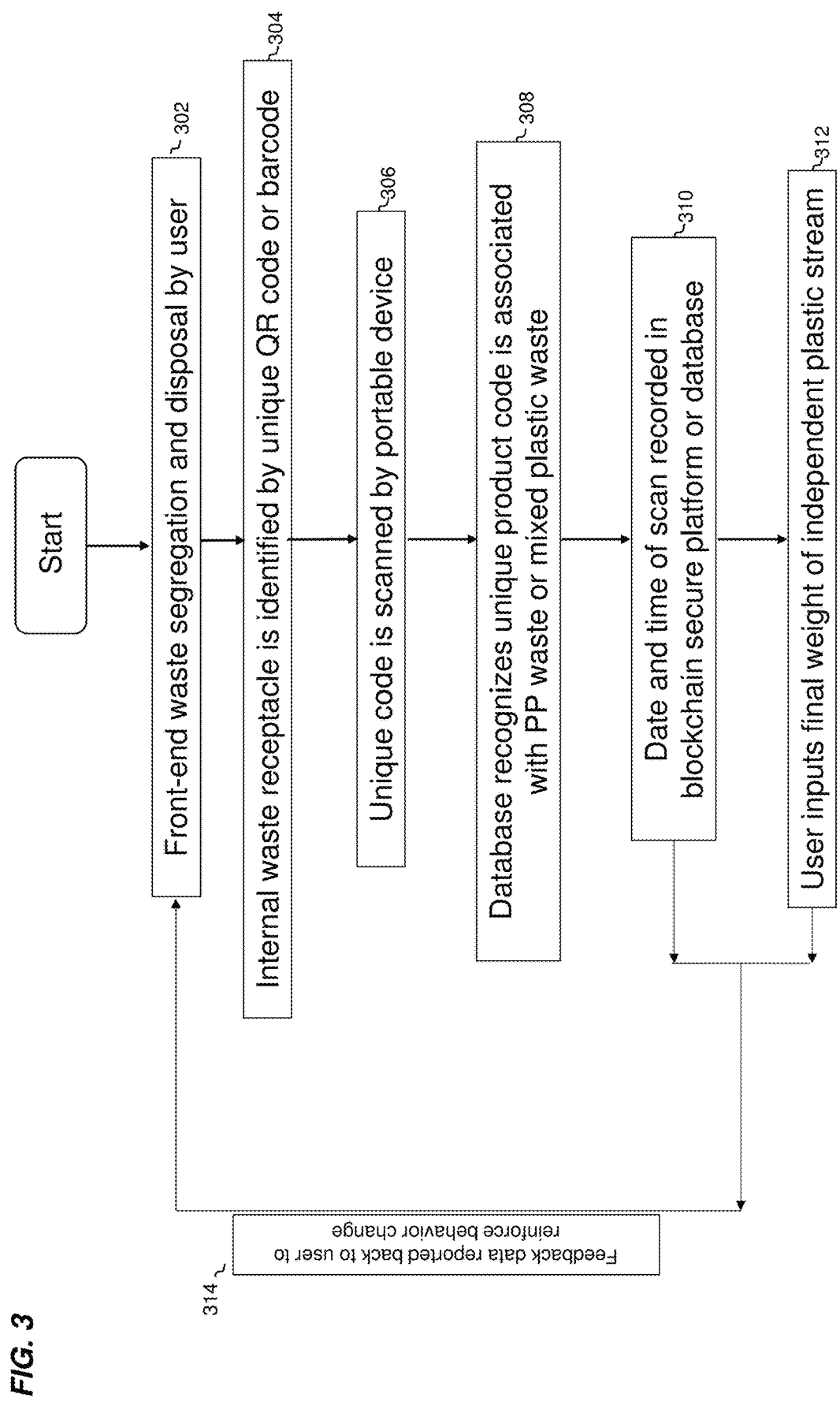
FIG. 3 shows an embodiment of a flowchart of a method used to track the production of individual plastic waste streams at discrete waste disposal locations, using production data to modify frontend and backend disposal/sortation in real-time.

In the case of the plastic diversion product, upon closing the entire box, each internal receptacle may also be closed. The internal polypropylene receptacle and internal mixed plastic receptacle will preferably also be identified each with a unique QR code. FIG. 3 outlines the process through which individual waste streams can be tracked. In one embodiment of the invention, the internal polypropylene receptacle and internal mixed plastic receptacle are both made of standardized biomedical waste bags. Following front-end segregation of waste and disposal by the user in step 302, each internal waste receptacle bag may be secured shut with a zip-tie that has a QR code, barcode, or other unique identifier for each waste stream at step 304. Upon downstream removal of the internal bags or internal receptacle prior to waste sterilization, the QR code of each plastic stream receptacle may be scanned at step 306 using the iOS or android mobile application or another digital portable device. In step 308, a database is preferably capable of recognizing that the unique code identifier previously scanned, or other product identifier used, is associated with a specific waste receptacle location and specific waste stream. Information like date and time may auto-populate within the database upon scanning or entry of a record, thereby timestamping the waste receptacle's closure/turnover at step 310. The user may be directed to a database in step 312 that prompts them to weigh each bag containing either the polypropylene or mixed plastic stream. Collected data may be stored within a blockchain secure platform. This data collection method will preferably allow for the example weight of the individual plastic stream to be recorded and for the calculation of waste production kinetics. This data collection will preferably allow total waste production and waste production kinetics for each plastic waste stream to be utilized as feedback data that may be reported back to individual users and/or institutions to reinforce disposal behavior at step 314.

Waste tracking functionality may be integrated into a larger environmental management system that may offer the following features: compliance alerts for regulatory deadlines, electronic storage of regulatory documents and permits, inventory management, personnel training management, shipment documentation, and solid and liquid waste pickup requests. Financial reports related to waste management may also be tracked with this embodiment of the software and may interface with electronic accounting services like QuickBooks®.

Figure 8:
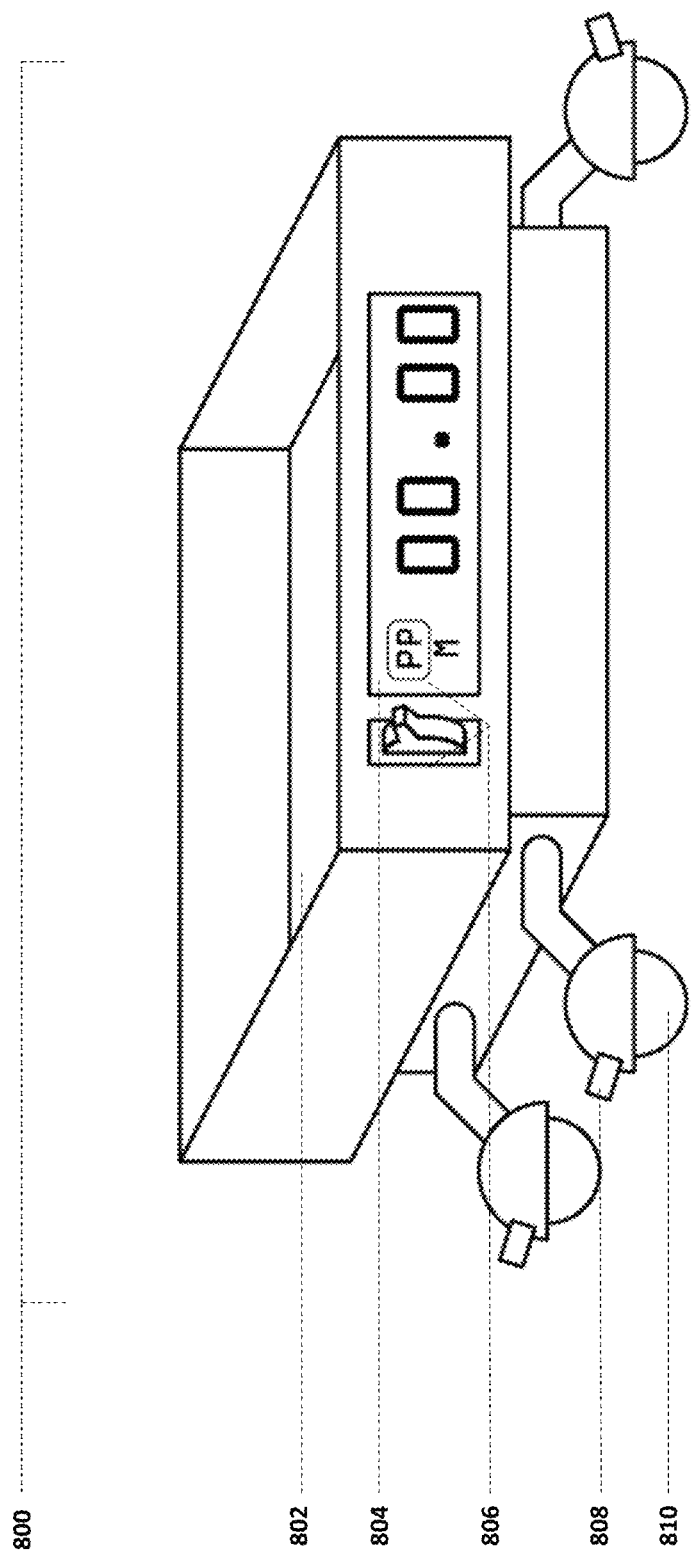
FIG. 8 shows an actuated stage for holding, moving, and weighing the contents of a waste receptacle.

FIG. 8 illustrates an embodiment of a mobile stage fashioned with wheels, accompanying breaks, and an internal scale to hold a plastic waste diversion product. The stage or platform 800 may be designed to secure a variety of medical waste receptacles including cardboard biohazard waste boxes and the waste receptacle illustrated in FIG. 7. On the side of the stage 800, a digital interface 804 may depict the current weight sensed by the internal scale 802. To allow for the separate measurement of each internal receptacle (for polypropylene waste and mixed plastic waste), a foot-pedal 806 may be accessible in order to toggle between the weight of each plastic stream. The stage may also be equipped with a braking system that may be engaged or disengaged with a foot pedal 808. This feature may allow the stage to be fixed in one location or readily moved using the attached wheels 810.

Figure 4:
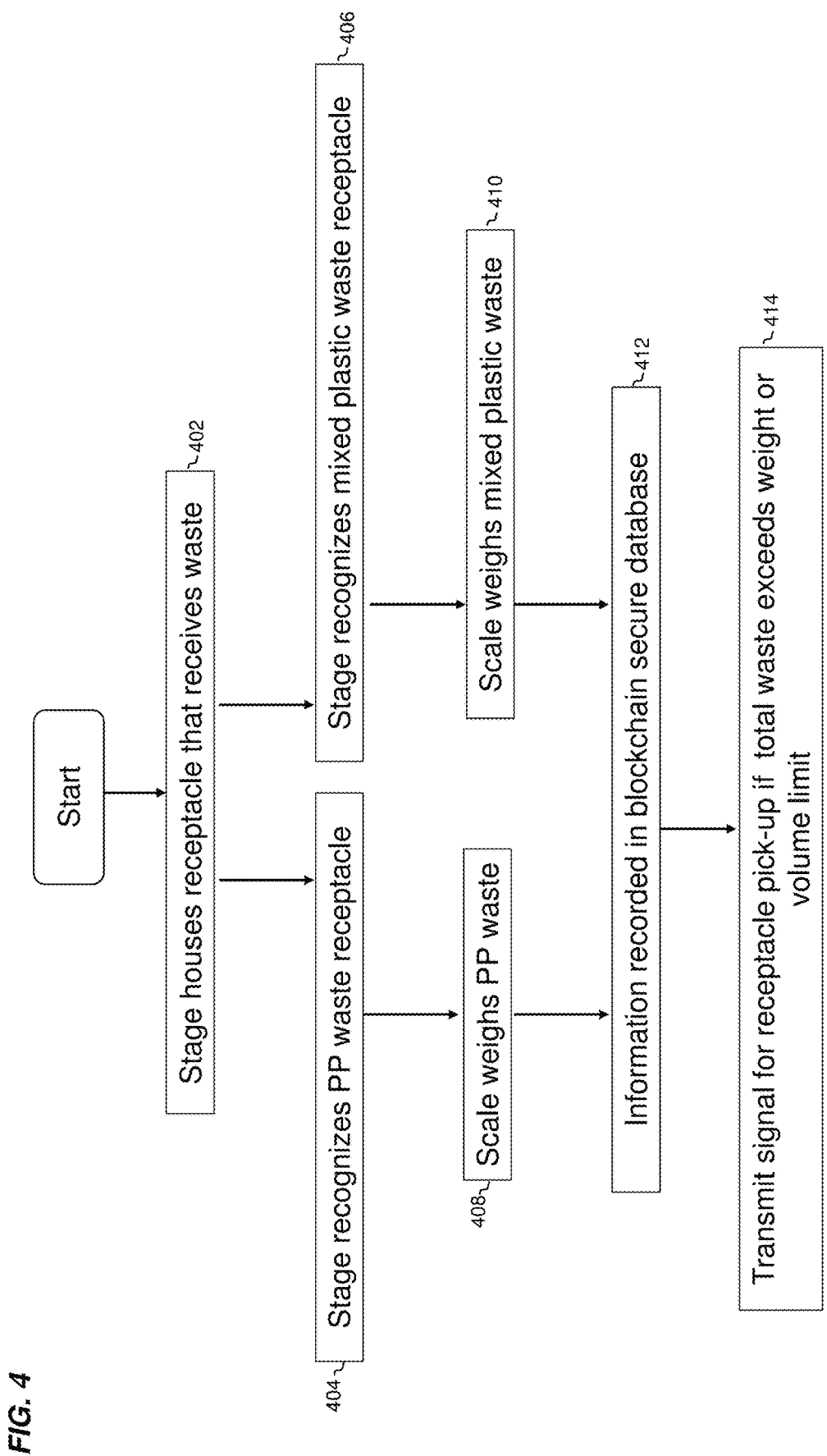
FIG. 4 shows an embodiment of a flowchart of a method of waste tracking using a stage that may house a plastic-diversion RMW receptacle or generalized RMW receptacle and utilizes an IoT-equipped scale to track waste production using a blockchain secure platform.

A process outlining one intended use of one embodiment of the stage in FIG. 8 is illustrated in FIG. 4. In step 402, the stage 800 may hold a waste receptacle similar to that which is outlined in FIG. 7 preferably as a waste receptacle is being filled, prior to receptacle closure, or just after receptacle closure. The stage may be partitioned and be capable of recognizing the PP waste receptacle or mixed plastic weight receptacle at step 404 and 406, respectively. A scale 802 that may be inside the stage may be capable of measuring the weight of the PP waste stream at step 408. Additionally, a scale 802 may be capable of measuring the weight of the mixed plastic waste stream at step 410. The scale 802, which may be connected to the internet or other communication network, preferably communicates the weights recorded from the scale to a blockchain secure database at step 412. At step 414, the scale 802, which is connected to a communication network, may be capable of transmitting a notification to waste managers that the receptacle has reached a waste weight limit.

In summary, the weight of the polypropylene plastic stream, mixed plastic stream, and total plastic will preferably be tracked using an internet of things (IoT) scale, while continuously uploading the data to a blockchain secure platform. This embodiment may contain a blockchain processing device. The collected data may provide users, regulators, and other authenticated parties reliable information regarding waste production with the added benefit of informing individuals within waste removal operations when these boxes have reached their weight limit and must be appropriately discarded. The stage fashioned with wheels, accompanying breaks, and internal scale may also hold generalized medical waste receptacles for tracking non-plastic waste. Similarly, non-plastic medical waste will preferably be tracked using an internet of things (IoT) scale, while continuously uploading that data to a blockchain secure platform.

This blockchain secure platform may also be used to track other medical waste streams and/or hazardous waste streams. In addition to tracking generalized medical waste and plastic waste, the blockchain secure platform may be used to track production and custody of liquid waste, radioactive waste, as well as chemotherapeutic waste.

Returning to FIG. 1, Prior to additional handling, the medical waste is preferably sterilized during step 108 and shredded in step 110. During the processing method, contaminating waste may be removed in step 112 to enhance the homogeneity of the polypropylene waste stream and mixed plastic waste stream, respectively. Moreover, the mixed plastic waste stream is preferably purified into separate polymer streams, including, but not limited to, PP, PS, HDPE, and PET-G. This may be accomplished using a variety of sensors to collect data that a processor can use to identify a piece of waste, determine if it is contaminating the waste stream, and have that item removed. A non-exhaustive list of sensors that may be used to identify non-plastic contaminants and other contaminating articles in waste stream include: cameras, video cameras, inductive sensors, spectral imaging sensors, and near-infrared sensors.

A camera and/or alternative form of audiovisual technology may be used to image a given waste stream or waste article and reference a database containing known waste items. This process may automate the removal of a known or unknown contaminant within the waste stream. Preferably, data regarding contamination will be collected using a camera and/or an alternative form of audiovisual technology for waste streams undergoing sortation and purification to quantify contamination. Data may be processed by a cloud analyzer to determine the degree of contamination, preferably assigning a purity and/or quality score to the material stream. This score, in one embodiment of the present invention, will be used to direct required recycled resin blending, compounding and/or fortification. Subsequently, waste production data and/or a quality score will be communicated to the generators of the material stream to modify behavior employed for front-end segregation of plastic waste.

Additionally, inductive sensors may be used to identify metallic items contaminating a waste stream. Both spectral imaging sensors and near-infrared sensors can be employed to verify the material composition of an item within a waste stream and subsequently increase the purity of the desired waste stream. These sensors may help automate the removal of contaminating articles within a given recyclable waste stream.

Select metal articles may also be removed from a recyclable waste stream using their ferromagnetic properties. More specifically, ferromagnetic materials may be removed by exposing each of the two plastic waste streams to a magnet. Non-ferromagnetic metal contaminants may also be identified for removal using an inductive sensor, metal detector or visual inspection by an attendant who loads the material into the process.

Colored and opaque plastic items may be removed from the polypropylene stream using an automated sorting system that is capable of identifying colored plastic or opaque plastic. Further removal of the colored or opaque plastic may be conducted manually by attendants. The intended purpose of this step within the process is to purify the polypropylene waste stream with valuable, clear polypropylene plastic. The colored and opaque plastic previously removed may be added to the mixed plastic waste stream for subsequent processing.

A solvent wash may be employed to remove any hydrophobic ink markings and/or labels present on certain plastic items. A step utilizing mechanical agitation or high-friction scrubbing may also be used to remove adherent contaminants on plastic products. Each of these purification steps utilized prior to recycling preferably allows for the enrichment of each polymer stream by isolating the more valuable clear products. A density separation technique may be used to separate polypropylene and polystyrene plastics. In addition to utilizing a sterilization method that results in at least a log 6 kill factor, the system will preferably employ two additional steps to enhance and verify the removal of biological agents. First, the polypropylene and mixed plastic stream may be treated with a nuclease wash so as to remove any residual nucleotides. This step will preferably occur following shredding, granulation and/or micronization. Second, each lot of plastic that has undergone processing may also undergo an endotoxin assay as a form of quality control. This step will preferably occur after shredding and grinding. Additionally, the raw and pelletized recycled plastic may undergo spectral analysis to verify the quality of the plastic. Residual, contaminating solvents may be removed using micronization technology that preferably increases plastic surface area exposure for cleaning during an aqueous washing step. Additionally, contaminating monomers, oligomers, and solvents, may be removed from the plastic stream utilizing devolatilization technology. Each step of the processing method preferably increases the homogeneity and purity of the recyclable plastic stream.

Prior to these processing steps intended to reduce non-plastic contamination and enhance the homogeneity of each waste stream, each individual plastic stream will preferably be shredded at step 110 into small pieces to aid in further processing. The plastic waste streams may also undergo a grinding cycle, granulation cycle and/or micronization in step 114 to further reduce the size of each plastic article. After shredding, purification through contaminant removal, and granulation, the material preferably is subjected to a solvent wash to remove residual liquid and or contaminating solvents in step 116. A subsequent blending step may include the addition of a polymer blending agent, compatibilizer, or virgin resin in step 118. Further processing of the raw material can include melting, extrusion (step 120) or molding to create a plastic article.

With the aforementioned sterilization and melting of recycled medical waste, the extruded recycled resin may be used to mold a plastic product in step 122. These recycled plastic articles may include polypropylene-based laboratory products, polypropylene biomedical waste bags, polypropylene containers or other objects.

Sterilization and/or decontamination of the materials in step 108 of this process may be accomplished using a number of methods including, but not limited to, heat, chemicals, and/or radiation. Examples of primary decontamination and/or sterilization methods for the plastic medical waste may include autoclave, ozone, microwave, or other forms of decontamination utilizing heat, steam, and/or pressure. The primary decontamination and/or sterilization process will preferably result in at least a log 6 kill factor. Secondary decontamination or disinfection steps will preferably be employed in the process of material stream purification. Secondary disinfecting steps may include, but are not limited to, mechanical agitation through micronization, chemical treatment, devolatilization, and/or extrusion.

Figure 15:
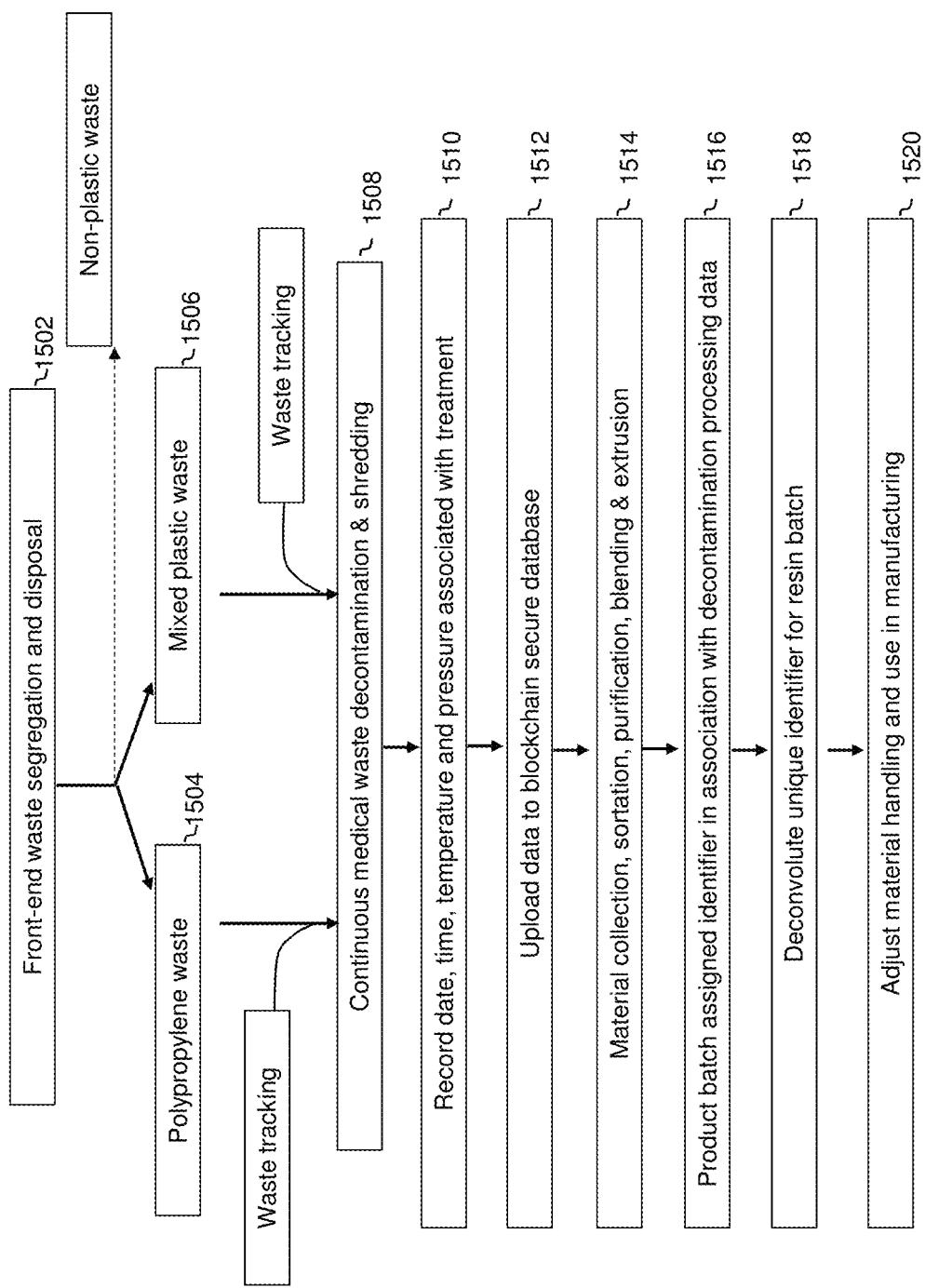
FIG. 15 shows an embodiment of a flowchart outlining a continuous process of medical waste decontamination and shredding in a single unit instrument equipped with an IoT device that preferably records data associated with waste treatment parameters to inform subsequent material processing.

FIG. 15 shows an embodiment of a flowchart outlining the continuous system of decontamination and shredding that may be utilized prior to sortation and purification. The plastic articles of the medical waste are preferably segregated from non-plastic articles using waste diversion products at discrete waste disposal sites at step 1502. With the manual assistance of the individual disposing of the plastic medical waste, the plastic articles are preferably further segregated into a polypropylene container at step 1504 and mixed plastic container at step 1506. Preferably, in a subsequent step, the front-end segregated waste may be decontaminated and shredded in one continuous step 1508. Preferably, an IoT device will record and upload data associated with the continuous decontamination and shredding step to the waste tracking database employed in the recycling method described 1510. Recorded data includes, but is not limited to, date, time, temperature, and pressure associated with the continuous decontamination and shredding process for a batch of treated waste. Data regarding decontamination and treatment will be associated with a unique identifier and uploaded to the waste tracking blockchain database 1512. Subsequent material stream collection, plastic polymer sortation, purification, blending, extrusion will preferably result in the production of recycled resin isolation 1514 and an associated unique resin batch identifier 1516. A subsequent user may deconvolute the unique identifier 1518 to verify material treatment to assess compatibility during subsequent manufacturing or inform subsequent handling 1520.

Following sterilization/decontamination, the polypropylene waste stream and the mixed plastic waste stream that were front-end segregated will preferably undergo additional purification steps mentioned above to remove contaminating articles. Additives and filler materials may be included in the blend to fortify the mechanical properties of the recyclable material. Additionally, additives may include clarifying agents to improve the final quality of the isolated recycled resin, anti-oxidants to improve subsequent recyclability, and/or compounds to improve ultraviolet-light stabilization. In an effort to optimize plastic processing and extrusion, the blended plastics can be melted and subsequently may be extruded over a range of temperatures (145-215° C.). A plastic compounding extruder may be used. The system preferably produces compositions of matter including raw materials for the future production of commercial products or a series of finished products. The product created from the polypropylene stream of recycled plastic may include polypropylene-based laboratory conicals, polypropylene pipette tips, polypropylene biomedical waste bags, and/or polypropylene containers. Finished products from the mixed plastic stream may include structural lumber, landscaping materials or other objects. These products can be colored using a paint on the final product exterior or through the incorporation of a colorant and/or dye during the processing outlined above.

Figure 12:
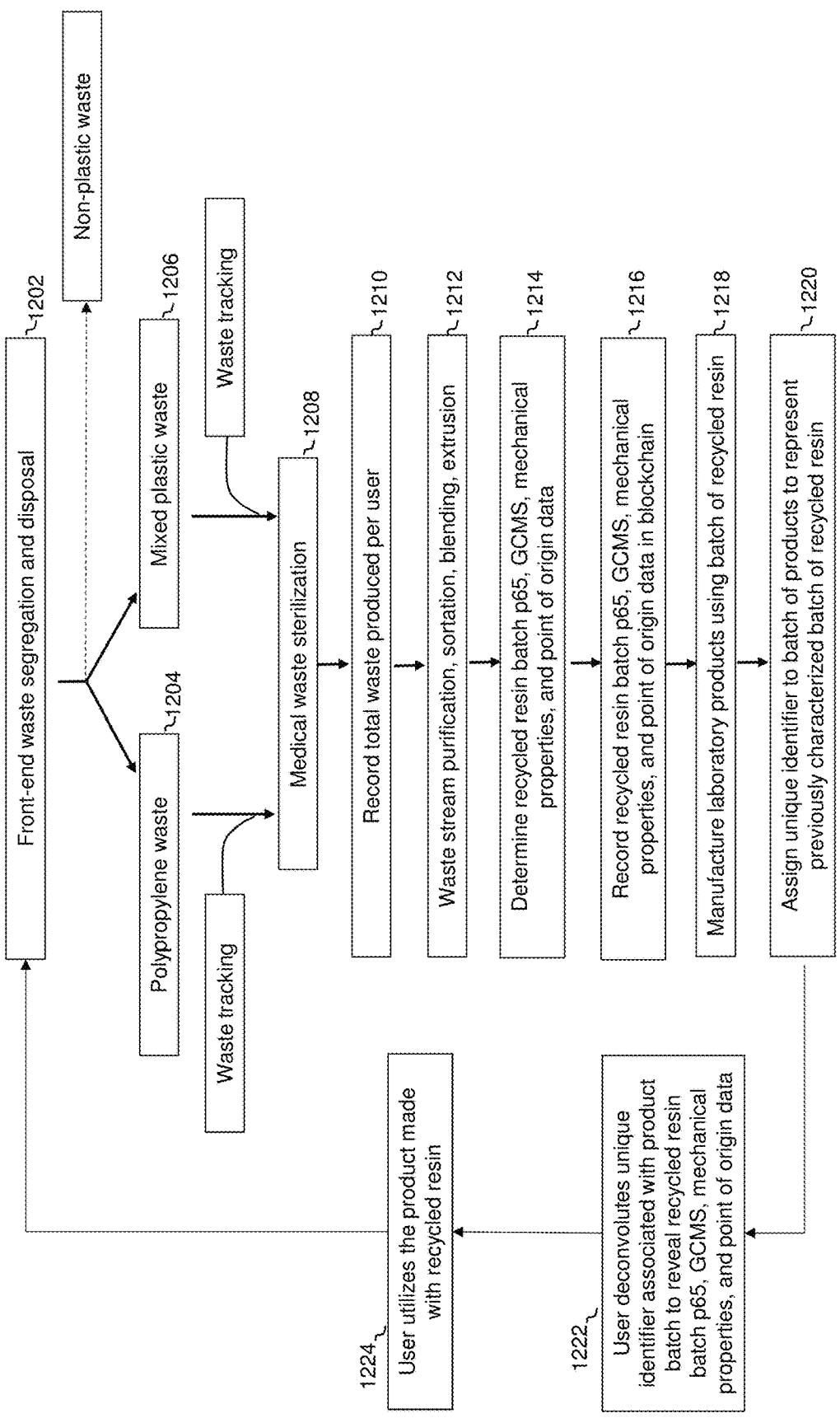
FIG. 12 shows an embodiment of a flowchart outlining the waste tracking software utilized in the recycling method to successfully manufacture a product whose principal components and characteristics can subsequently be identified and used as material input for subsequent recycling.

FIG. 12 shows an embodiment of a flowchart outlining the waste tracking software utilized in the recycling method to successfully manufacture a product whose principal components and characteristics can subsequently be identified, the product used, and then disposed of in accordance with the recycling method disclosed here. The plastic articles of the medical waste are preferably segregated from non-plastic articles using waste diversion products at discrete waste disposal sites at step 1202. With the manual assistance of the individual disposing of the plastic medical waste, the plastic articles are preferably further segregated into a polypropylene container at step 1204 and mixed plastic container at step 1206. Preferably, in a subsequent step, the front-end segregated waste will be decontaminated in step 1208. In a manner similar to the process outlined in FIG. 10, a record will preferably be created in the waste tracking database for specifying the total waste produced per user in step 1210. The waste may undergo further sortation, purification, blending and extrusion in step 1212. Preferably, the isolated product will be subjected to quality control (QC) and quality assurance (QA) tests including, but not limited to, proposition 65 testing (Prop 65), Gas Chromatography Mass Spectrometry (GCMS), and mechanical analysis in step 1214. A record may be created in the waste tracking database in step 1216 documenting the Prop 65, GCMS, mechanical property and/or point of origin data for the batch of recycled resin. This recycled resin may be used to manufacture plastic articles in step 1218. Subsequently, a unique identifier is assigned to the lot of products to represent the previously characterized recycled resin in step 1220. A downstream consumer or user may deconvolute the unique identifier associated with the lot of product to ascertain the QC, QA, and/or point of origin data in step 1222. In accordance with the recycling method outlined in this disclosure, the user may subsequently utilize the product (step 1224) and later dispose of this plastic product in step 1202.

The medical waste segregated at the time of disposal preferably creates a polypropylene and mixed plastic stream of plastic. While the polypropylene stream is relatively homogenous and subsequently purified with additional segregation processes, the mixed plastic stream is a heterogeneous aggregate of plastic polymers. In embodiments, the mixed plastic stream of medical waste comprises or consists of PE, HDPE, PS, PET, Low Density Polyethylene (LDPE) and/or PP. Within both the polypropylene stream and mixed plastic stream, additional recycled non-medical or nascent polymers may be added for fortification of the blend. These added polymers may include ethylene vinyl acetate (EVA), PP, PE, PS, polyamide, polycarbonate, PVC, polyester alone or in combination with one another. These additives may improve the mechanical properties of the raw materials or final products through adequate blending.

Additionally, additives may include clarifying agents to improve the final quality of the isolated recycled resin, anti-oxidants to improve subsequent recyclability, and/or compounds to improve UV-light stabilization.

In certain embodiments, materials of the invention for recycling the polypropylene stream of medical waste include recycled medical waste up to 85%, up to 90%, up to 95%, or more by weight of the final product. In other embodiments, materials of the invention include recycled non-medical or new polypropylene that is added to the recycled polypropylene medical waste. The recycled non-medical polypropylene or new polypropylene added to the recycled polypropylene medical waste may comprise 5-90% or more by weight of the final product. In each of the embodiments listed above, materials of the invention may include one or more blending agents.

In another embodiment, materials of the invention for recycling the mixed plastic stream of medical waste or non-hazardous waste may be further purified to isolate independent polymers including, but not limited to, PS, HDPE, PET, and/or PP. Independent polymer streams isolated from the mixed plastic streams may comprise 10-95% or more by weight of the final product. Added to this plastic stream may be one or more other recycled non-medical plastic polymers or nascent plastic polymers, filler material, or blending agents. Recycled non-medical plastic polymers and nascent plastic additives may include polyolefins like PS, HDPE, PET, and/or PP. Filler material may include polymer fibers and other materials. Recycled non-medical plastic or non-recycled plastic added to the isolates of the mixed plastic stream of recycled medical waste, or non-hazardous waste, may comprise 10-95% or more by weight of the blend. Preferred blends for the repurposing of the plastic stream of recycled medical waste include a blend of 10-95% or more by weight of the mixed plastic stream of recycled medical waste and 5-90% or more by weight recycled polyolefin, nascent polyolefin, recycled polymer, nascent polymer, blending agents, and/or filling agents. Colorant or dyes can be added to the homogenized blend to yield an article with uniform color. For each blend described above, 100% is equal to the weight of the final recycled plastic material.

Additionally, small amounts (e.g. less than 5% by weight of the final composition) of one or more colorants, blending agents, and or fillers can be added.

The recycled medical waste blends created by this invention may manifest as powder, pellets, or other shapes, or in the form of commercial products by way or extrusion and/or molding. The materials can be made in a number sizes and shapes that can be sold as raw material or used immediately to make commercial plastic products using standard manufacturing plastic procedures.

Figure 14:
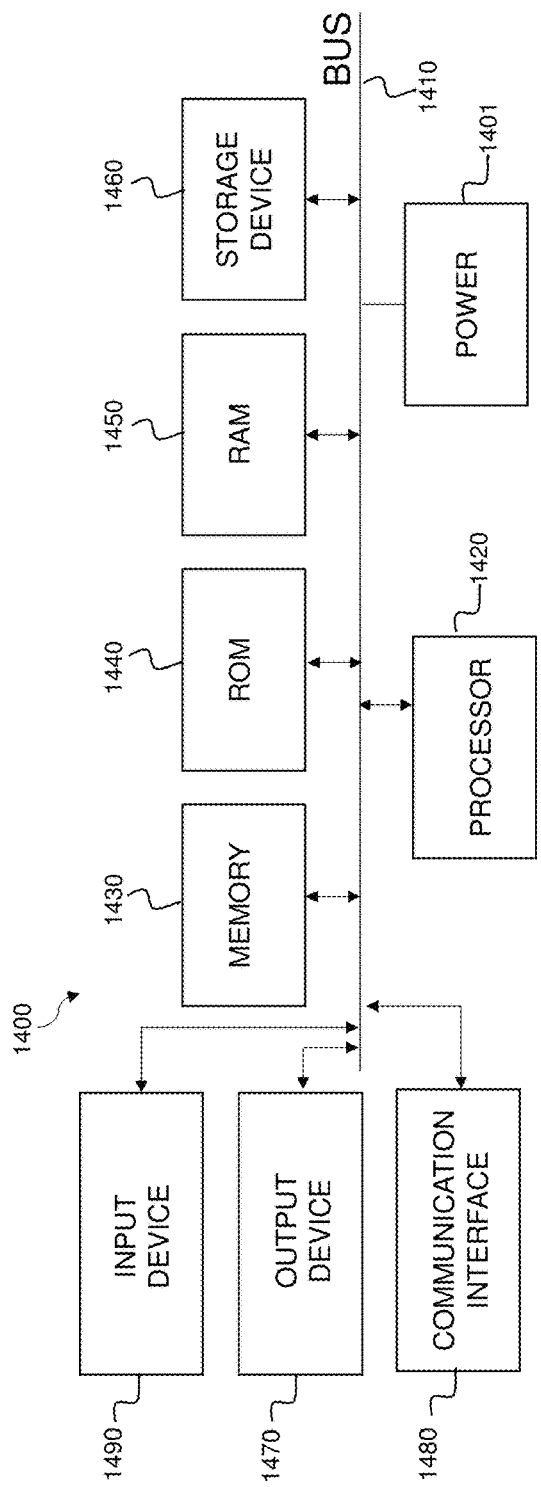
FIG. 14 is a schematic of an embodiment of a computing device.

FIG. 14 depicts a schematic of a preferred embodiment of a computing device 1400. The embodiments of the invention described herein may use one or more computing devices 1400. Device 1400 preferably includes a power source 1401. For example, power source 1401 may be a battery, a chemical power source, a solar energy converter, a power converter to receive power from a wall receptacle or the like, a mechanical power source, or source of power.

Power source 1401 is preferably used to supply power to the remaining components of computing device 1400. Computing device 1400 preferably further includes an integrated circuit (i.e. a system on a chip (SoC)). The SoC preferably integrates multiple components of a computer or other electronic system into a single chip. It may contain digital, analog, mixed-signal, and radio-frequency functions all on a single chip substrate. The SoC preferably incorporates one or more of a central processing unit (CPU), a graphics processing unit (GPU), and a system bus 1 that couples various system components including the system memory 1430, dynamic random-access memory (RAM) 1450 and flash memory 1460, to the SoC. The system bus may be one of several types of bus structures including a memory bus or memory controller, a peripheral bus, or a local bus using one of a variety of bus architectures. A basic input/output (BIOS) stored in flash memory 1460 or the like, may provide the basic routine that helps to transfer information between elements within computing device 1400, such as during start-up. The drives and the associated computer readable media provide nonvolatile storage of computer readable instructions, data structures, program modules and other data for computing device 1400. The basic components are known to those of skill in the art and appropriate variations are contemplated.

Although the exemplary environment described herein employs flash memory, it is appreciated by those skilled in the art that other types of computer readable media which can store data that are accessible by a computer, such as magnetic cassettes, hard drives, digital versatile disks, cartridges, random access memories (RAMs) 1450, read only memory (ROM) 1440, a cable or wireless signal containing a bit stream and the like, may also be used in the exemplary operating environment.

Computing device 1400 further preferably includes a networking device 1480. Networking device 1480 is able to connect to, for example, the Internet, one or more Local Area Networks ("LANs"), one or more Metropolitan Area Networks ("MANs"), one or more Wide Area Networks ("WANs"), one or more Intranets, etc. Networking device 1480 may be capable of connecting to wireless Bluetooth devices (e.g. a keyboard or a mouse). Preferably, networking device 1480 is a wireless networking device (e.g. Wi-Fi), however hard-wired networks can be coupled to networking device 1480 (e.g. ethernet). Furthermore, networking device 1480 may also connect to distributed computing environments where tasks are performed by local and remote processing devices that are linked (either by hardwired links, wireless links, or by a combination thereof) through a communications network. In a distributed computing environment, program modules may be located in both local and remote memory storage devices.

To enable user interaction with computing device 1400, there is preferably an input receiving device 1490. Input receiving device 1490 can receive input from a number of input mechanisms, such as a microphone for speech, a touch-sensitive screen for gesture or graphical input, a keyboard, a mouse, motion input, RJ-45, USB, and so forth. In some instances, multimodal systems enable a user to provide multiple types of input to communicate with the computing device 1400. There is no restriction on the invention operating on any particular hardware arrangement and therefore the basic features here may easily be substituted for improved hardware or firmware arrangements as they are developed.

Computing device 1400 further preferably includes at least one output port 1470. Output port 1470 connects computing device 1400 to a TV, speaker, projector, or other audio-visual device. Preferably, output port 1470 is a HDMI port, optical audio port, serial port, USB port, networking port, s-video port, coaxial cable port, composite video, composite audio, and/or VGA port. In preferred embodiments, computing device 1400 may also include additional auxiliary components (e.g. power management devices or digital audio convertors).

For clarity of explanation, the illustrative system embodiments are presented as comprising individual functional blocks. The functions these blocks represent may be provided through the use of either shared or dedicated hardware, including, but not limited to, hardware capable of executing software. For example, the functions of one or more processors presented in FIG. 14 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large-scale integration (VLSI) hardware embodiments, as well as custom VLSI circuitry in combination with a general purpose DSP circuit, may also be provided.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a computer, specialty computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A plastic waste recycling system, comprising:
a plastic waste tracking system comprising a database of plastic waste status data;
a plurality of plastic waste receptacles, each plastic waste receptacle associated with an individual identifier;
at least one identifier scanning device, each identifier scanning device adapted to scan each individual identifier and upload information regarding the associated plastic waste receptacle to the plastic waste tracking system; and
a plastic waste processing system, the plastic waste processing system adapted to receive plastic waste from each plastic waste receptacle and update the plastic waste tracking system;
wherein the plastic waste processing system is adapted to process the plastic waste and output a recycled plastic product; and
wherein the outputted recycled plastic product is comprised of one or more additives selected from compatibilizing agents, antioxidants, chemical tracing compounds, blending agents, colorants, and compounds enhancing product recyclability.

2. The plastic waste recycling system of claim 1, wherein the plastic waste is regulated medical plastic waste and the plastic waste processing system at least one of sterilizes or decontaminates the plastic waste.

3. The plastic waste recycling system of claim 1, wherein the plastic waste tracking system is a blockchain secure platform and the blockchain secure platform is updated to track the plastic waste through the plastic waste recycling system.

4. The plastic waste recycling system of claim 1, wherein the data updated in the plastic waste tracking system includes at least one of an origination location of the plastic waste, an origination weight of the plastic waste, a date of plastic waste collection, a time of plastic waste collection, a process undergone by the plastic waste, a location of plastic waste processing, a date of plastic waste processing, a time of plastic waste processing, or a composition of processed plastic waste.

5. The plastic waste recycling system of claim 1, wherein each plastic waste receptacle is adapted to separate polypropylene waste from mixed plastic waste.

6. The plastic waste recycling system of claim 5, wherein the polypropylene waste is processed differently from the mixed plastic waste.

7. The plastic waste recycling system of claim 1, wherein the plastic waste processing system at least one of removes of colored, contaminated, or non-clear plastic, removes contaminants, shreds the plastic waste, blends the plastic waste with processing agents, granulates the plastic waste, or forms the plastic waste into a recycled product.

8. The plastic waste recycling system of claim 1, further comprising a user feedback system, the user feedback system adapted to provide information to users of each plastic waste receptacle, wherein the information is based on the data received by the plastic waste tracking system.

9. The plastic waste recycling system of claim 1, wherein each plastic waste receptacle has a waste capacity sensor, wherein the waste capacity sensor is adapted to at least one of provide an alert to a user and update the plastic waste tracking system.

10. The plastic waste recycling system of claim 1, wherein the outputted recycled plastic product is a blend of recycled plastic and at least one non-recycled plastic.

11. The plastic waste recycling system of claim 1, wherein the data received by the plastic waste tracking system is used by the plastic waste processing system to adjust the processing of the plastic waste.

12. A method of recycling plastic waste, comprising:
creating a database of plastic waste status;
receiving plastic waste at plurality of plastic waste receptacles;
associating each plastic waste receptacle with an individual identifier;
scanning each individual identifier and uploading information regarding the associated plastic waste receptacle to the database;
receiving plastic waste from each plastic waste receptacle at a plastic waste processing location;
processing the plastic waste;
updating the plastic waste tracking system with data from the plastic waste processing location; and
outputting a recycled plastic product, wherein the outputted recycled plastic product is comprised of one or more additives selected from compatibilizing agents, antioxidants, chemical tracing compounds, blending agents, colorants, and compounds enhancing product recyclability.

13. The method of claim 12, wherein the plastic waste is medical plastic waste, further comprising the steps of at least one of sterilizing or decontaminating the plastic waste.

14. The method of claim 12, wherein the database is a blockchain secure platform and the blockchain secure platform is updated to track the plastic waste through the plastic waste recycling system.

15. The method of claim 12, wherein the data updated in the database includes at least one of an origination location of the plastic waste, an origination weight of the plastic waste, a date of plastic waste collection, a time of plastic waste collection, a process undergone by the plastic waste, a location of plastic waste processing, a date of plastic waste processing, a time of plastic waste processing, or a composition of processed plastic waste.

16. The method of claim 12, further comprising separating polypropylene waste from mixed plastic waste at each plastic waste receptacle.

17. The method of claim 16, wherein the polypropylene waste is processed differently from the mixed plastic waste.

18. The method of claim 12, wherein the step of processing the a plastic waste comprises at least one of removing of colored, contaminated, or non-clear plastic, removing contaminants, shredding the plastic waste, blending the plastic waste with processing agents, granulating the plastic waste, or forming the plastic waste into a recycled product.

19. The method of claim 12, further comprising providing user feedback to users of each plastic waste receptacle, wherein the feedback is based on the data received by the plastic waste tracking system.

20. The method of claim 12, further comprising providing user feedforward information to manufacturers and/or users of each plastic products, wherein the feedforward information is based on the data received by the plastic waste tracking system including at least one of mechanical performance of the recycled resin, safety specifications for the recycled resin, and a number of times material has been recycled.

21. The method of claim 12, further comprising providing user feedback information to users regarding carbon footprint reduction based on recycling efforts at a resolution of at least one of individual personnel, research laboratories, entire research institutions or manufacturing facilities.

22. The method of claim 12, further comprising providing user feedforward information to users regarding carbon footprint reduction based on sustainable procurement by each user at a resolution of at least one of individual personnel, research laboratories, entire research institutions or manufacturing facilities.

23. The method of claim 12, wherein each plastic waste receptacle has a waste capacity sensor, further comprising at least one of providing a waste capacity alert to a user and updating the database.

24. The method of claim 12, wherein the outputted recycled plastic product is a blend of recycled plastic and at least one non-recycled plastic.

25. The method of claim 12, wherein the data received by the database is used to adjust the processing of the plastic waste.

* * * * *